US 8,649,032 B2

(12) United States Patent
Takenaka

(10) Patent No.: US 8,649,032 B2
(45) Date of Patent: Feb. 11, 2014

(54) IMAGE PROCESSING APPARATUS, IMAGE PROCESSING METHOD, AND STORAGE MEDIUM

(75) Inventor: Shuichi Takenaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/474,527

(22) Filed: May 17, 2012

(65) Prior Publication Data

US 2012/0307276 A1   Dec. 6, 2012

(30) Foreign Application Priority Data

May 30, 2011   (JP) ................................. 2011-120660

(51) Int. Cl.
*G06F 3/12*   (2006.01)
*G06K 15/00*   (2006.01)

(52) U.S. Cl.
CPC ..................................... *G06K 15/00* (2013.01)
USPC .......................... 358/1.13; 358/1.15; 358/1.17

(58) Field of Classification Search
USPC ............... 358/1.13, 1.15, 1.17, 448, 1.2, 451, 358/498; 399/385, 395, 406, 407, 408, 409, 399/410
See application file for complete search history.

(56) References Cited

U.S. PATENT DOCUMENTS

| 6,762,855 | B1 * | 7/2004 | Goldberg et al. | 358/1.5 |
| 8,345,298 | B2 * | 1/2013 | Ito | 358/1.17 |
| 2004/0196498 | A1 * | 10/2004 | Klassen | 358/1.15 |
| 2005/0094175 | A1 * | 5/2005 | Christiansen et al. | 358/1.13 |
| 2010/0134844 | A1 * | 6/2010 | Ito | 358/1.17 |

FOREIGN PATENT DOCUMENTS

| JP | 8-297560 A | 11/1996 | |
| JP | 11188932 | * 7/1999 | B41J 29/38 |
| JP | 2003-305915 A | 10/2003 | |
| JP | 2011242855 | * 12/2011 | G06F 3/12 |

* cited by examiner

*Primary Examiner* — Jerome Grant, II
(74) *Attorney, Agent, or Firm* — Canon U.S.A., Inc. IP Division

(57) ABSTRACT

If the RIP processing time of a specific page of a plurality of pages in a processing block exceeds a predetermined time, the RIP processing of the specific page is not yet completed, and the RIP processing of pages preceding the specific page is already completed, an image processing apparatus sets a processing block that includes only the RIP processing completed pages preceding the specific page. The number of pages included in the newly set processing block is less than a predetermined number of pages.

7 Claims, 26 Drawing Sheets

FIG.6

```
<?xml version="1.0" encoding="UTF8"?>
<JDF>
 <ResourcePool>
  <RunList>
   <LayoutElement>
     <FileSpecMimeType="application/ppml"URL="file://printdata.ppml" />
   </LayoutElement>
  </RunList>
  <LayoutPreparationParams Sides="OneSidedFront"
       PresentationDirection="zXy" StackDepth="100" />

... ABBREV. ...
```

FIG.9

| 1 | 26 | 2 | 27 | 3 | 28 | 4 | 29 | 5 | 30 | | 24 | 49 | 25 | 50 |
|---|---|---|---|---|---|---|---|---|---|---|---|---|---|---|
| 51 | 76 | 52 | 77 | 53 | 78 | 54 | 79 | 55 | 80 | ... | 74 | 99 | 75 | 100 |

| FIRST PAGE | SECOND PAGE | THIRD PAGE | FOURTH PAGE | FIFTH PAGE | | TWENTY-FOURTH PAGE | TWENTY-FIFTH PAGE |

FIG.10A  FIG.10B  FIG.10C

| $_1X_1$ = 1ST ITEM | $_1X_2 = {_1}X_1 + N$ = 1 + 25 = 26TH ITEM |
|---|---|
| $_1X_3 = {_1}X_2 + N$ = 26 + 25 = 51ST ITEM | $_1X_4 = {_1}X_3 + N$ = 51 + 25 = 76TH ITEM |

FIRST PAGE

| $_2X_1 = {_1}X_1 + 1$ = 1 + 1 = 2ND ITEM | $_2X_2 = {_2}X_1 + N$ = 2 + 25 = 27TH ITEM |
|---|---|
| $_2X_3 = {_2}X_2 + N$ = 27 + 25 = 52ND ITEM | $_2X_4 = {_2}X_3 + N$ = 52 + 25 = 77TH ITEM |

SECOND PAGE

| $_3X_1 = {_2}X_1 + 1$ = 2 + 1 = 3RD ITEM | $_3X_2 = {_3}X_1 + N$ = 3 + 25 = 28TH ITEM |
|---|---|
| $_3X_3 = {_3}X_2 + N$ = 28 + 25 = 53RD ITEM | $_3X_4 = {_3}X_3 + N$ = 53 + 25 = 78TH ITEM |

THIRD PAGE

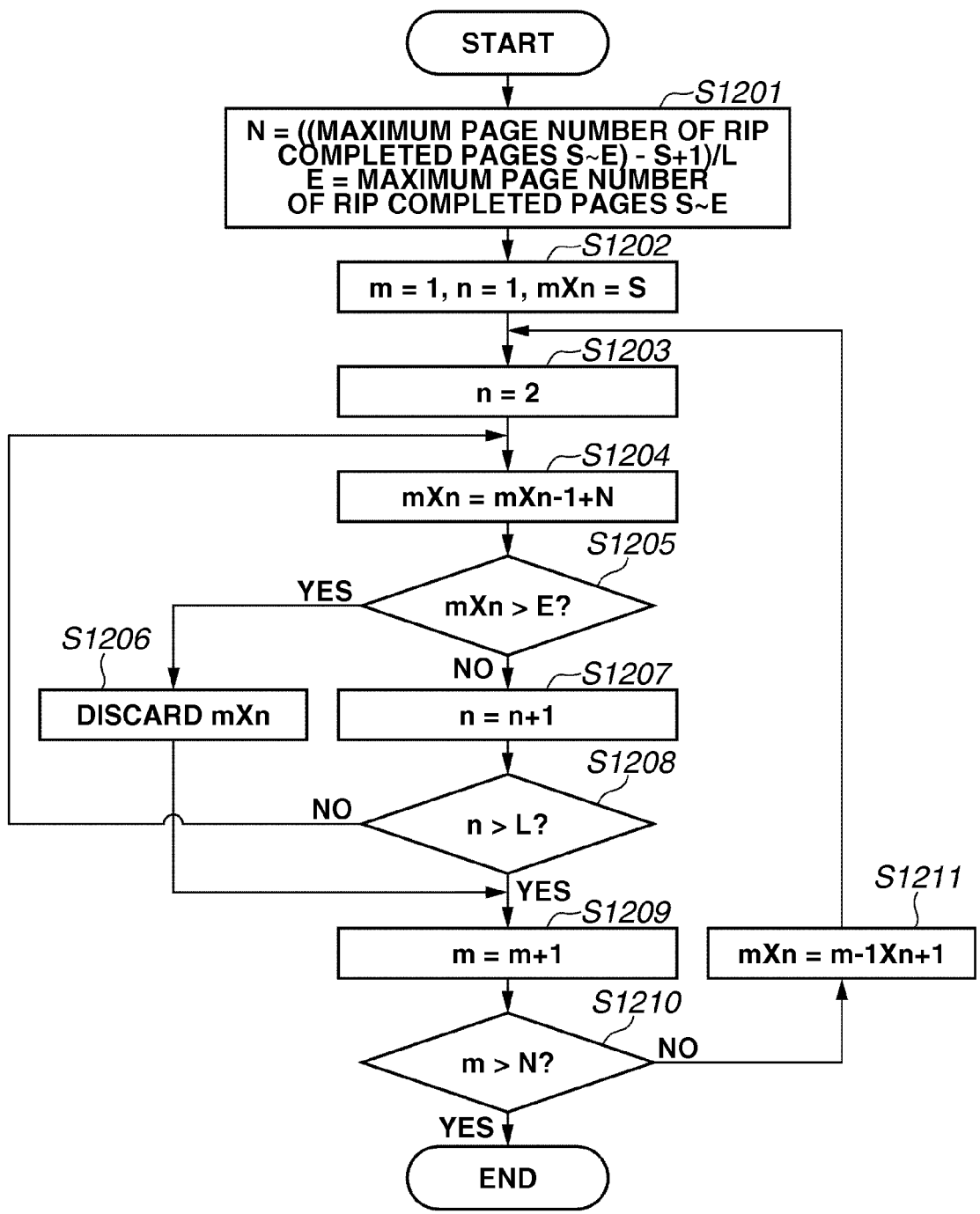

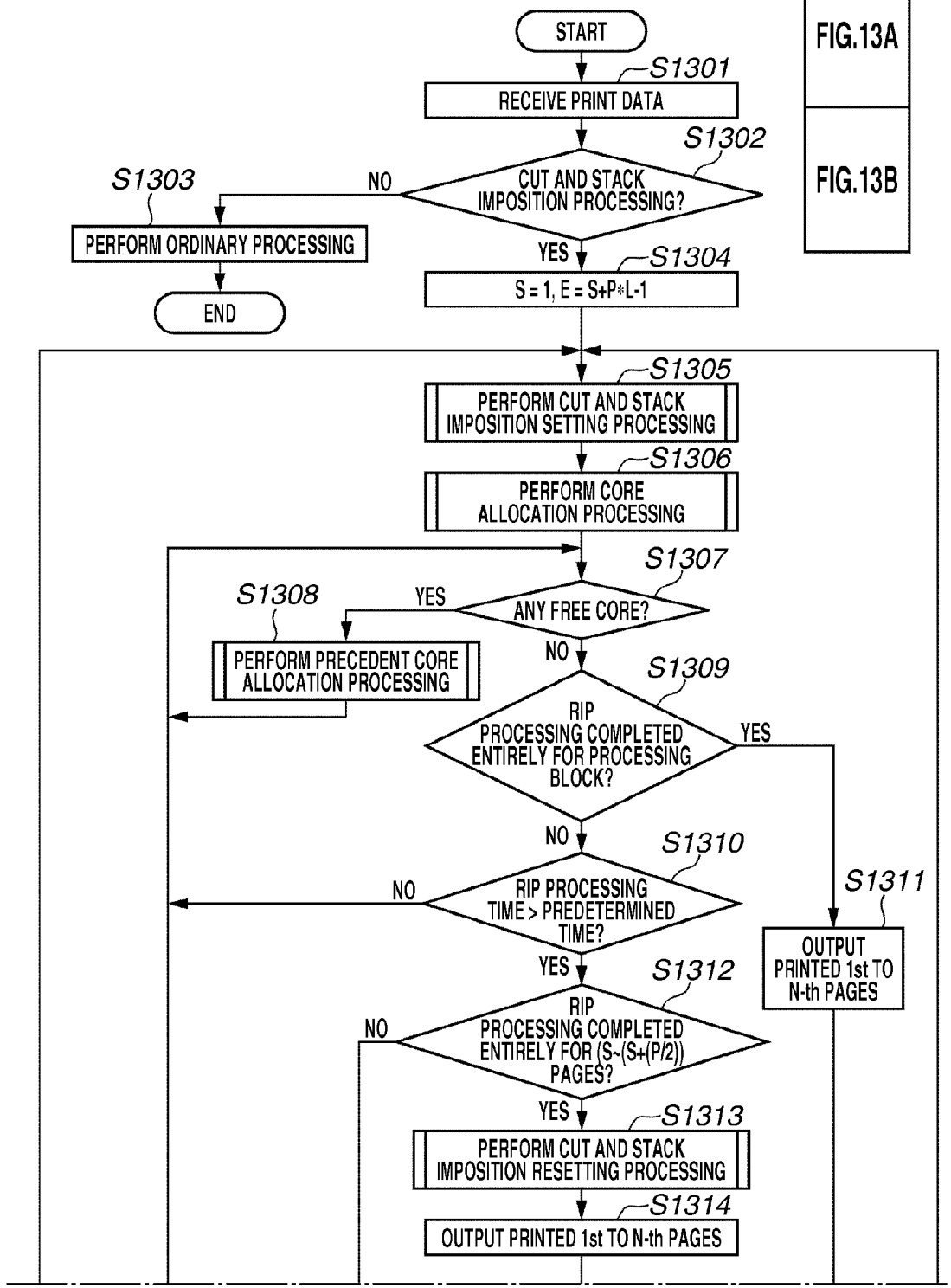

FIG.16

| 125 | 150 | 124 | 149 | 123 | 148 | | 104 | 129 | 103 | 128 | 105 | 127 | 101 | 126 |
|---|---|---|---|---|---|---|---|---|---|---|---|---|---|---|
| 175 | 200 | 174 | 199 | 173 | 198 | . . . | 154 | 179 | 153 | 178 | 152 | 177 | 151 | 176 |
| FIRST PAGE | | SECOND PAGE | | THIRD PAGE | | | TWENTY-SECOND PAGE | | TWENTY-THIRD PAGE | | TWENTY-FOURTH PAGE | | TWENTY-FIFTH PAGE | |

FIG.17A  FIG.17B  FIG.17C

| $_1X_1 = 101 + N$<br>$\quad -1$<br>$= 101 + 25$<br>$\quad -1$<br>$= 125\text{TH ITEM}$ | $_1X_2 = {}_1X_1 + N$<br>$= 125 + 25$<br>$= 150\text{TH ITEM}$ |
|---|---|
| $_1X_3 = {}_1X_2 + N$<br>$= 150 + 25$<br>$= 175\text{TH ITEM}$ | $_1X_4 = {}_1X_3 + N$<br>$= 175 + 25$<br>$= 200\text{TH ITEM}$ |

FIRST PAGE

| $_2X_1 = {}_1X_1 + 1$<br>$= 125 - 1$<br>$= 124\text{TH ITEM}$ | $_2X_2 = {}_2X_1 + N$<br>$= 124 + 25$<br>$= 149\text{TH ITEM}$ |
|---|---|
| $_2X_3 = {}_2X_2 + N$<br>$= 149 + 25$<br>$= 174\text{TH ITEM}$ | $_2X_4 = {}_2X_3 + N$<br>$= 174 + 25$<br>$= 199\text{TH ITEM}$ |

SECOND PAGE

| $_3X_1 = {}_2X_1 + 1$<br>$= 124 - 1$<br>$= 123\text{RD ITEM}$ | $_3X_2 = {}_3X_1 + N$<br>$= 123 + 25$<br>$= 148\text{TH ITEM}$ |
|---|---|
| $_3X_3 = {}_3X_2 + N$<br>$= 148 + 25$<br>$= 173\text{RD ITEM}$ | $_3X_4 = {}_3X_3 + N$<br>$= 173 + 25$<br>$= 198\text{TH ITEM}$ |

THIRD PAGE

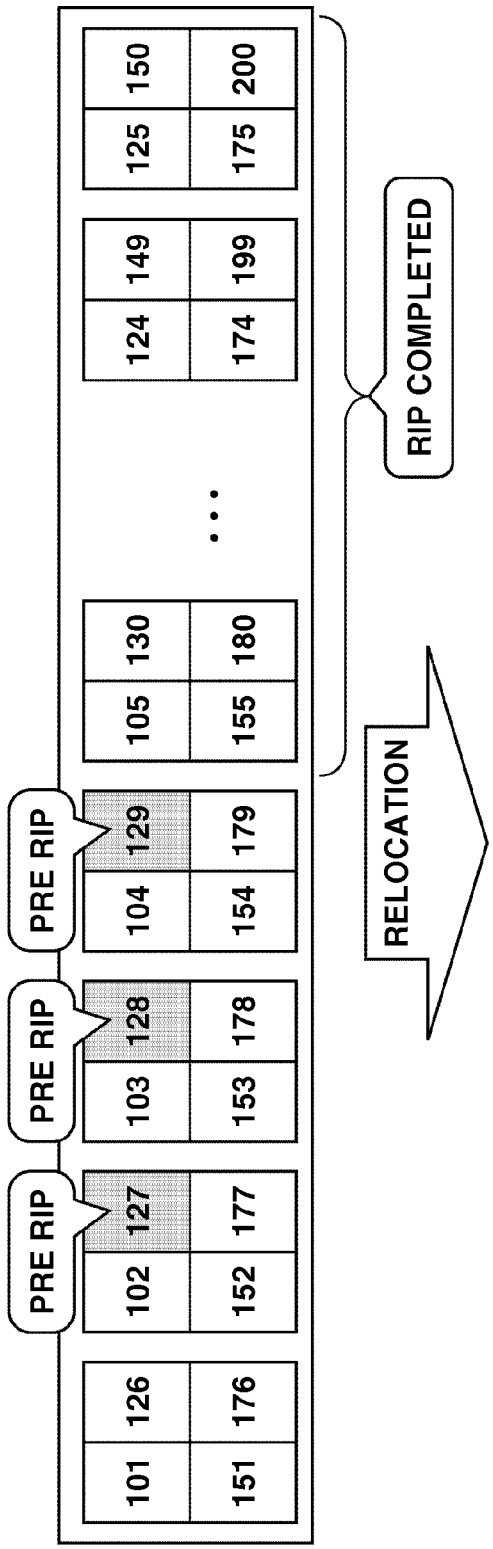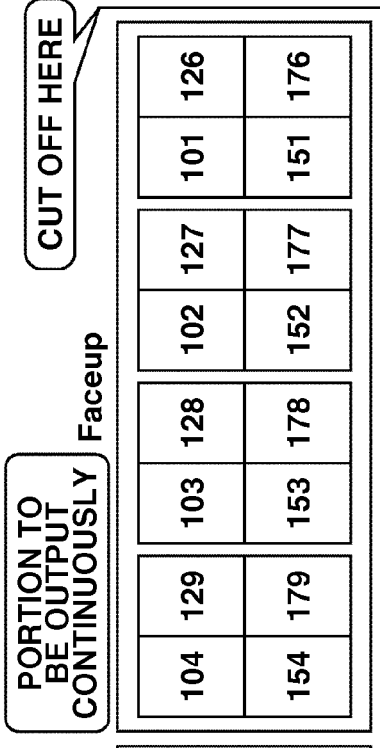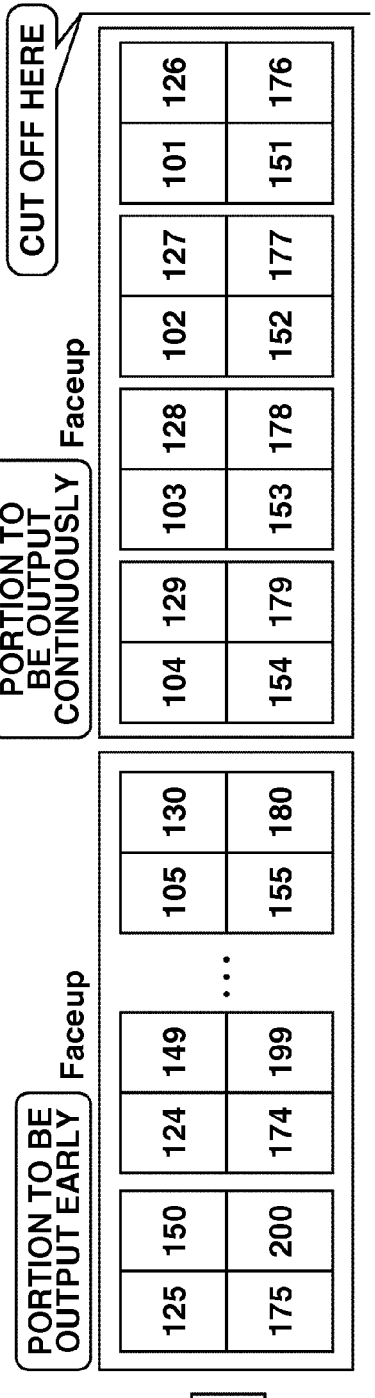

FIG.21

| PAGE NUMBER | RIP PROCESSING STATE | RIP COMPLETION TIME |
|---|---|---|
| 1 | RIP COMPLETED | 13:32 |
| 2 | RIP COMPLETED | 13:57 |
| 3 | RIP COMPLETED | 13:57 |
| 4 | RIP COMPLETED | 13:58 |
| 5 | RIP COMPLETED | 13:59 |
| 6 | RIP COMPLETED | 13:56 |
| 7 | RIP COMPLETED | 13:55 |
| 8 | RIP COMPLETED | 13:59 |
| 9 | RIP COMPLETED | 14:00 |
| 10 | RIP COMPLETED | 14:00 |
| 11 | RIP COMPLETED | 14:01 |
| 12 | RIP COMPLETED | 14:02 |
| 13 | RIP COMPLETED | 14:02 |
| 14 | RIP COMPLETED | 14:00 |
| 15 | RIP COMPLETED | 14:01 |
| 16 | RIP COMPLETED | 14:04 |
| 17 | RIP COMPLETED | 14:03 |
| 18 | RIP COMPLETED | 14:03 |
| 19 | RIP COMPLETED | 14:04 |
| 20 | RIP IN PROGRESS | |
| 21 | RIP IN PROGRESS | |
| 22 | RIP COMPLETED | 14:04 |
| 23 | RIP COMPLETED | 14:05 |
| 24 | RIP COMPLETED | 14:06 |
| 25 | RIP COMPLETED | 14:08 |
| 26 | RIP COMPLETED | 14:08 |
| 27 | RIP COMPLETED | 14:10 |
| 28 | RIP COMPLETED | 14:11 |
| 29 | RIP COMPLETED | 14:10 |
| 30 | RIP COMPLETED | 14:10 |
| 31 | RIP IN PROGRESS | |
| 32 | RIP IN PROGRESS | |
| 33 | PRE RIP | |

FIG.24

| PAGE NUMBER | NUMBER OF REUSABLE OBJECTS | NUMBER OF VARIABLE OBJECTS | RIP PROCESSING STATE | PROCESSING BLOCK ID | OUTPUT FORM |
|---|---|---|---|---|---|
| 1 | 5 | 5 | RIP COMPLETED | 1 | FaceDown |
| 2 | 12 | 1 | RIP COMPLETED | 1 | FaceDown |
| 3 | 3 | 2 | RIP COMPLETED | 1 | FaceDown |
| 4 | 2 | 4 | RIP COMPLETED | 1 | FaceDown |
| 5 | 1 | 9 | RIP COMPLETED | 1 | FaceDown |
| 6 | 12 | 8 | RIP COMPLETED | 1 | FaceDown |
| 7 | 15 | 6 | RIP COMPLETED | 1 | FaceDown |
| 8 | 13 | 8 | RIP IN PROGRESS | 1 | FaceDown |
| 9 | 12 | 3 | RIP IN PROGRESS | 1 | FaceDown |
| 10 | 3 | 5 | RIP COMPLETED | 1 | FaceDown |
| 11 | 0 | 2 | RIP COMPLETED | 1 | FaceDown |
| 12 | 5 | 10 | RIP COMPLETED | 1 | FaceDown |
| 13 | 0 | 2 | RIP COMPLETED | 1 | FaceDown |
| 14 | 7 | 2 | RIP COMPLETED | 1 | FaceDown |
| 15 | 3 | 5 | RIP IN PROGRESS | 1 | FaceDown |
| 16 | 1 | 6 | RIP IN PROGRESS | 1 | FaceDown |
| 17 | 2 | 4 | PRE RIP | 1 | FaceDown |
| 18 | 3 | 15 | PRE RIP | 1 | FaceDown |
| 19 | 11 | 1 | PRE RIP | 1 | FaceDown |
| 20 | 0 | 2 | PRE RIP | 1 | FaceDown |
| 21 | 13 | 3 | PRE RIP | 1 | FaceDown |
| 22 | 12 | 1 | PRE RIP | 1 | FaceDown |
| 23 | 14 | 2 | PRE RIP | 1 | FaceDown |
| 24 | 0 | 5 | PRE RIP | 1 | FaceDown |
| 25 | 5 | 7 | PRE RIP | 2 | FaceUp |
| 26 | 9 | 1 | PRE RIP | 2 | FaceUp |
| 27 | 5 | 19 | PRE RIP | 2 | FaceUp |
| 28 | 10 | 20 | PRE RIP | 2 | FaceUp |
| 29 | 15 | 7 | PRE RIP | 2 | FaceUp |
| 30 | 6 | 25 | PRE RIP | 2 | FaceUp |
| 31 | 32 | 2 | PRE RIP | 2 | FaceUp |
| 32 | 5 | 2 | PRE RIP | 2 | FaceUp |

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Description of the Related Art

To improve the productivity and economize the count number in a print operation, an image forming apparatus capable of performing aggregate imposition is conventionally proposed to print a plurality of screen images on the same surface of a bigger sheet that is several times larger in size than a required sheet. Regarding economizing the count number in printing, the copy fee per sheet generally remains the same regardless of the paper size in many cases. For example, the print fee can be reduced if two images of A4 size can be disposed on a single sheet of A3 size. In this case, a print job includes post-processing to cut the printed sheet into several sections corresponding to respective screen images after the printing is completed. As a result, a desired print product can be obtained without increasing the count number in each print operation.

Further, regarding the productivity, the print speed in a case where the long side of an A4 sheet is positioned at the head in a sheet feeding operation is not so different from the print speed in a case where the short side of an A5 sheet is positioned at the head. Further, the sheet feeding operation of an A5 sheet with its long side positioned at the head can be controlled to be the same in speed as the sheet feeding operation of an A4 sheet with its long side positioned at the head. Accordingly, in a case where the required copy size is A5, the productivity does not substantially decrease even when two screen images are disposed on a single sheet. Rather, the productivity may be improved because the amount of sheets is doubled through a cutting process.

Japanese Patent Application Laid-Open No. 2003-305915 discusses a cutting based aggregate imposition method for realizing imposition in which divided sheets can be arranged correctly in page order when respective sheets are stacked after the cutting process is completed. In the following description, the above-described cutting based imposition method is referred to as "cut and stack imposition" method.

The cut and stack imposition is, for example, available in the field of variable data print (VDP) that enables a user to obtain a printout result differentiated for individual clients. The variable data print (VDP) is a technique capable of obtaining a printout result, which is partly different depending on each record, based on client data registered beforehand when each job is processed. The "record" is a unit of sequential VDP processing. For example, when the printing is performed differently for each client, one record is constituted by print data dedicated to each client.

A VDP job is associated with a variable object variable depending on each record. The variable object is combined and printed together with a master object that serves as a common background of the record. The VDP job, even if a plurality of records is included, can be managed as a single job. Further, an object to be used for a plurality of times in the job is referred to as "reusable object." The reusable object can store a rasterized bitmap image or intermediate data, which can be reused in the second time or after, so that the processing speed can be increased.

When the variable data print is widely used, it is useful to employ a technique capable of processing a VDP job in a parallel fashion to further increase the processing speed of the VDP job. A relevant conventional technique is discussed in Japanese Patent Application Laid-Open No. 8-297560. The conventional parallel processing technique includes analyzing a page description language (PDL) of print data and dividing a job into respective pages (or objects) to be generated as print data. The conventional technique further includes performing parallel processing to generate a print image using a plurality of Raster Image Processors (RIP) to increase the processing speed.

SUMMARY OF THE INVENTION

According to an aspect of the present invention, an image processing apparatus includes a division unit configured to divide print data into processing blocks, each including a predetermined number of pages as a unit of sheet cutting, a cut and stack imposition setting unit configured to perform cut and stack imposition setting on a plurality of pages included in the processing block so as to dispose the plurality of pages included in the processing block within a region of one physical page, a raster image processor (RIP) processing unit configured to perform RIP processing on the plurality of pages included in the processing block which are subjected to the cut and stack imposition by the cut and stack imposition setting unit, a setting unit configured, if RIP processing time of a specific page of the plurality of pages in the processing block exceeds a predetermined time, the RIP processing of the specific page is not yet completed, and the RIP processing of pages preceding the specific page is already completed, to set a processing block which includes only the RIP processing completed pages that precede the specific page and the number of pages included in the set processing block is less than the predetermined number of pages, a cut and stack imposition resetting unit configured to perform resetting of the cut and stack imposition on the plurality of pages included in the processing block in such a way as to dispose the plurality of RIP processing completed pages included in the processing block set within a region of one physical page by the setting unit, and an output unit configured to print and output the plurality of pages included in the processing block based on the cut and stack imposition reset by the resetting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of Job Definition Format (JDF) data that can realize the cut and stack imposition processing.

FIG. 9 illustrates an example page layout for aggregate printing, in which the total number of recording sheets required to perform the aggregate printing is 25 and four pages of the print data collectively constitute a single recording sheet.

FIGS. 10A to 10C illustrate an example layout of respective pages when the print data includes 100 pages and the cut and stack imposition processing is performed to aggregate four pages.

FIG. 11 is a flowchart illustrating an example of cut and stack imposition resetting processing.

FIG. 16 illustrates an example page layout for the aggregate printing, in which the total number of recording sheets required to perform the aggregate printing is 25, and four pages of the page data collectively constitute a single recording sheet and is relocated to Face-Up printing.

FIGS. 17A to 17C illustrate an example layout of respective pages when the print data includes 100 pages (101st to 200th pages) and the cut and stack imposition processing is performed to aggregate four pages from the last page.

FIGS. 18A to 18C illustrate an example of the processing performed in step S1315 to step S1317 illustrated in FIG. 13.

FIG. 21 illustrates an example of a page state management table according to the second exemplary embodiment of the present invention.

FIG. 24 illustrates an example of a page state management table according to the third exemplary embodiment of the present invention.

DESCRIPTION OF THE EMBODIMENTS

Various exemplary embodiments, features, and aspects of the invention will be described in detail below with reference to the drawings.

An imposition method for the cut and stack imposition is different from the ordinary aggregate imposition in that a latter-part page is disposed at a lower right region of the first page depending on the aggregation number and the number of pages obtainable through cutting process. In a state where the RIP processing of a significant number of pages is already completed, if the processing of a specific page takes a long time or when the RIP processing of pages logically disposed on a physical page is not thoroughly completed, pages following the physical page cannot be output. When a cut and stack imposition VDP job is processed in a parallel fashion, if the processing of a specific page takes a long time, other processing may be performed ahead. However, even in a case where the RIP processing is executed first, if the processing of a specific page takes a long time, it is unfeasible to output any page following the physical page unless the RIP processing of all logical pages disposed on the specific physical page is completed in the cut and stack imposition.

In view of the foregoing problems, the present invention is directed to a technique capable of reducing a printout time of the entire print data.

Exemplary embodiments of the present invention are described in detail below with reference to attached drawings.

Figure 1:
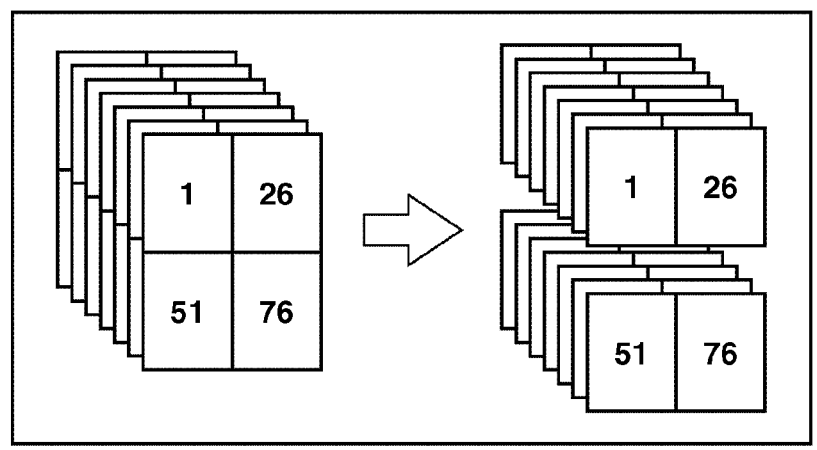
FIG. 1 illustrates an example layout for a cut and stack imposition.
Figure 2:
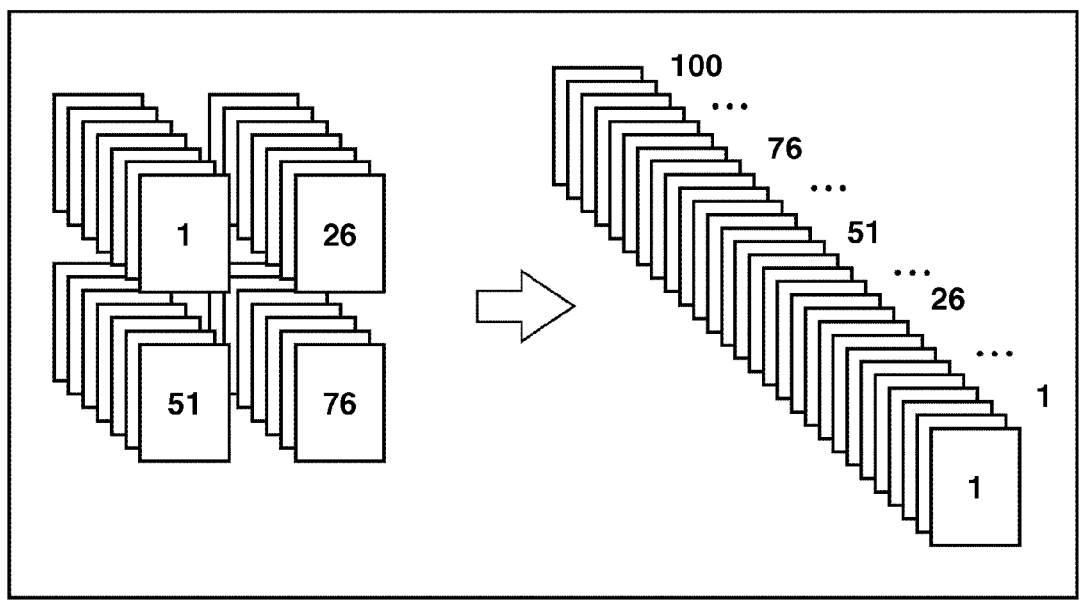
FIG. 2 illustrates a working procedure to create a booklet by repetitively cutting a product obtained through the cut and stack imposition and piling up the cut sheets.

FIG. 1 illustrates an example layout for the cut and stack imposition. FIG. 2 illustrates a working procedure to create a booklet by repetitively cutting a product obtained through the cut and stack imposition and piling up the cut sheets. A system according to a first exemplary embodiment performs, as a basic concept, cut and stack imposition resetting processing, as described below.

Figure 3:
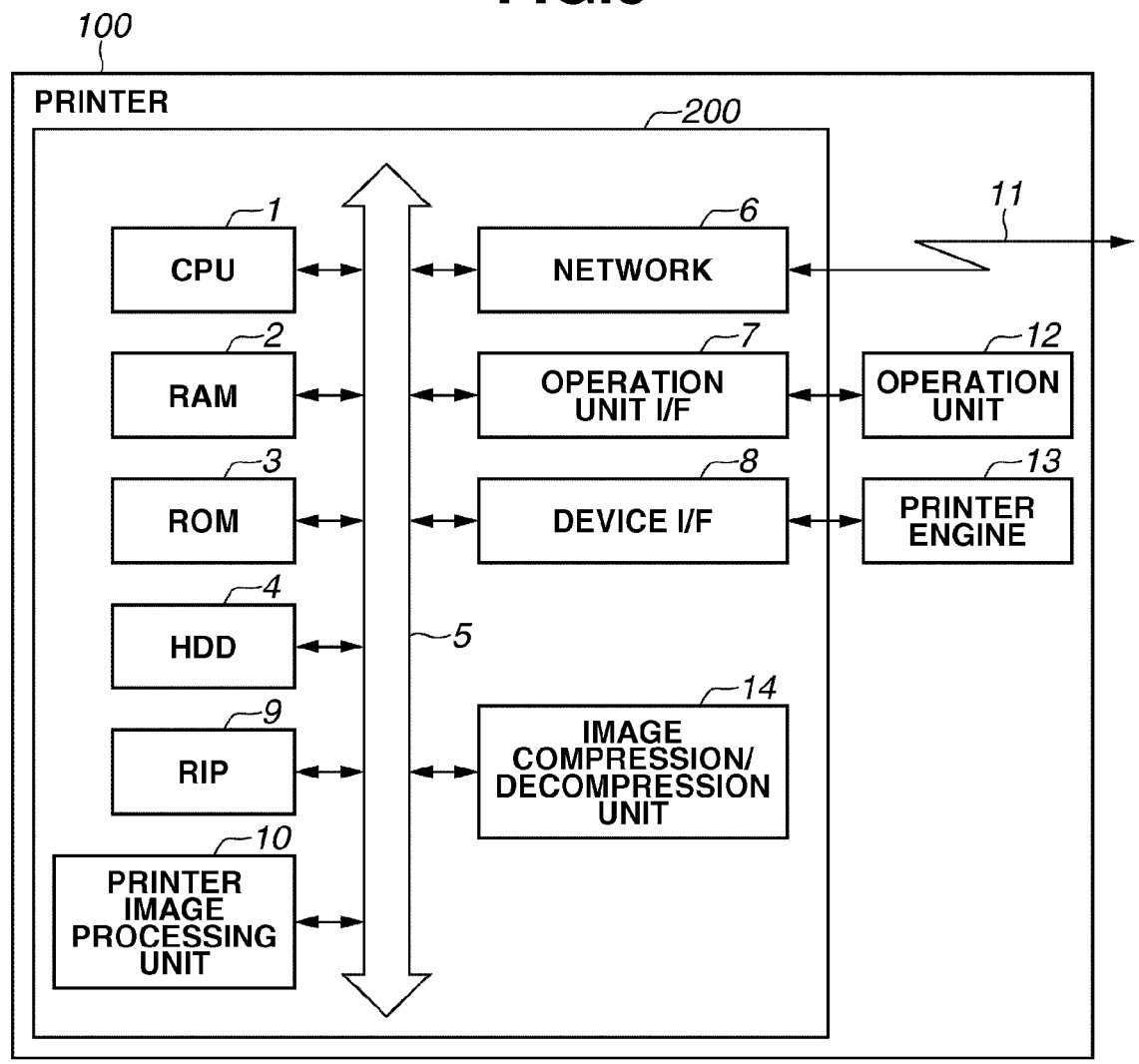
FIG. 3 illustrates an example of a hardware configuration of an image forming apparatus, which is an example of an image processing apparatus (i.e., a computer), according to an exemplary embodiment of the present invention.

FIG. 3 illustrates an example of a hardware configuration of an image forming apparatus, which is an example of an image processing apparatus (e.g., a computer). Although the present exemplary embodiment is described by using the configuration of a single image forming apparatus as an example, the image forming apparatus is connected to an information processing apparatus, such as a personal computer and a workstation. A print job, after having been subjected to the cut and stack imposition, can be mainly transferred from the information processing apparatus to the image forming apparatus via a network or an appropriate interface, e.g., a universal serial bus (USB).

A controller unit 200 can control input/output of image signals and device information. A program relating to processing contents according to the exemplary embodiment of the present invention is stored in a read only memory (ROM) 3 or in a hard disk drive (HDD) 4 and can be installed on the image forming apparatus. A central processing unit (CPU) 1 can execute the program when it is loaded into a random access memory (RAM) 2 from the ROM 3 or the HDD 4. The CPU 1 causes a software module (software) described below to function by executing the program. Further, the CPU 1 can comprehensively control each device connected via a system bus 5.

The RAM 2 is functionally operable as a main memory or a work memory for the CPU 1. The ROM 3 stores a boot program to be executed when a power source is turned on. The HDD 4 stores an operating system and a main control program required to control the image forming apparatus. Further, the HDD 4 can be used to store a large amount of data temporarily or for a long term. A network 6 is connected to a local area network 11 to input and output print data and device information from and to an external device. For example, a program can be input via the network 6 and stored in the ROM 3 or the HDD 4, and the program can be installed on the image forming apparatus.

An operation unit interface (I/F) 7 is an interface unit connected to an operation unit 12. Image data to be displayed on the operation unit 12 can be output via the operation unit I/F 7 to the operation unit 12. Further, if there is information input by a user of the image forming apparatus via the operation unit 12, the operation unit I/F 7 can transmit the input information to the CPU 1. The operation unit 12 includes a liquid crystal panel and a sound source, which can respectively serve as an output device. The operation unit 12 further includes a touch panel, hard keys, and a microphone, which can respectively serve as an input device. The controller unit 200 is connected to a printer engine 13 via a device I/F 8. The device I/F 8 can transmit an image signal, instruct a device to perform an operation, and receive device information based on an instruction supplied from the CPU 1.

The printer engine 13 is an electrophotographic-type or inkjet-type output machine, which can output an image signal received from the controller unit 200 onto a medium. A raster image processor (RIP) 9 is a dedicated hardware that can rasterize intermediate print data into a raster image. The RIP 9 can speedily process intermediate print data, which is generated by the CPU 1 on the RAM 2, in parallel with the execution of processing by the CPU 1. A printer image processing unit 10 can perform image correction and halftoning processing on image data to be printed out. An image compression/decompression unit 14 can perform compression and decompression processing on image data.

Like the RIP 9, a part of the image forming apparatus except for the printer engine 13 can be constituted by an appropriate hardware circuit, such as Application Specific Integrated Circuit (ASIC). On the contrary, an appropriate software program is employable to realize a part or the whole of the hardware circuit.

An appropriate disk drive corresponding to a portable disk recording medium (e.g., a compact disk (CD) or a digital versatile disk (DVD)) can be connected to the system bus 5. Similarly, a memory reader/writer corresponding to a portable nonvolatile recording medium (e.g., a flash memory) can be connected to the system bus 5. Further, the program according to the exemplary embodiment can be stored in the ROM 3 or the HDD 4 via the portable storage medium and can be installed on the image forming apparatus.

Figure 4:
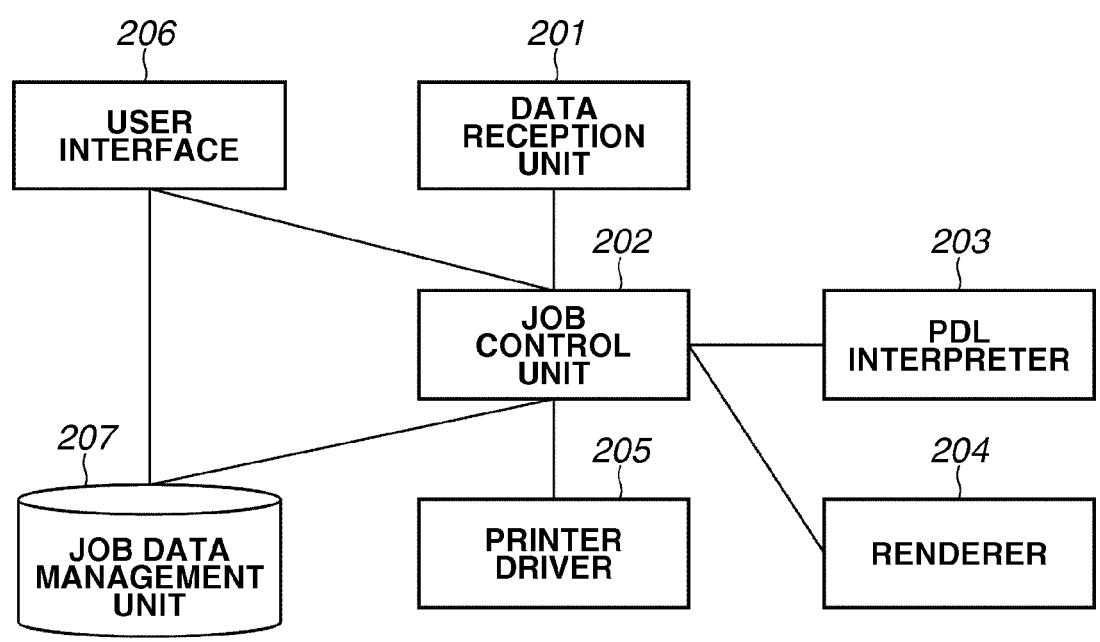
FIG. 4 illustrates an example of a software module configuration of the image forming apparatus.

FIG. 4 illustrates an example of a software module configuration of the image forming apparatus. Each software module illustrated in FIG. 4 is stored as a program in the HDD 4 and can be executed by the CPU 1 when it is loaded into the RAM 2.

A data reception unit 201 can receive print data transmitted from a host. The received data is stored in a job data management unit 207 via a job control unit 202. The job control unit 202 can perform an entire job control relating to reception of data and printing of the received data. A page description language (PDL) interpreter 203 can interpret print data and generate a display list, that is intermediate data. The generated display list can be stored in the job data management unit 207 via the job control unit 202.

A renderer 204 is a module that can generate a bitmap image based on the display list. Most of the processing can be executed by the RIP 9 as the dedicated hardware. The generated bitmap image can be stored in the job data management unit 207 via the job control unit 202. A printer driver 205 can transmit a print instruction and a bitmap image to the printer engine 13 via the device I/F 8.

A user interface 206 is a module that can control the operation unit 12 via the operation unit I/F 7. The user interface 206 can mainly generate data to be displayed on the liquid crystal panel of the operation unit 12 and can update the display of the liquid crystal panel according to a user instruction input via the touch panel. Further, if a job execution instruction is input via the touch panel, the user interface 206 transmits the instruction to the job control unit 202. The job data management unit 207 is a database that can store and manage the print data, the display list, and the bitmap image temporarily or for a long term.

Figure 5:
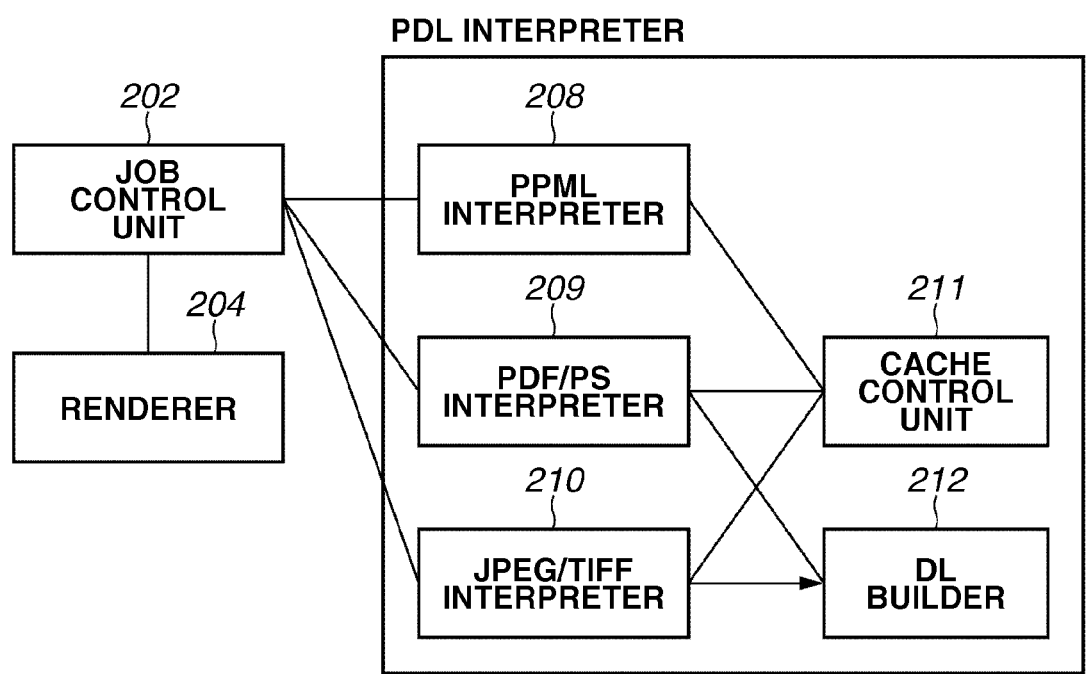
FIG. 5 illustrates an example of a detailed software module configuration of a PDL interpreter.

FIG. 5 illustrates an example of a detailed software module configuration of the PDL interpreter 203 illustrated in FIG. 1. In the present exemplary embodiment, the page description language (PDL) included in the print data is Personalized Print Markup Language (PPML). However, the PDL interpreter 203 can be configured to include any additional interpreter that can interpret another VDP language, such as Portable Document Format/Variable and Transactional (PDF/VT).

Further, in the following description, the content PDL of the PPML data is any one of PostScript (registered trademark, hereinafter, referred to as "PS"), Portable Document Format (PDF), Joint Photographic Experts Group (JPEG), and Tagged Image File Format (TIFF). However, any other content PDL is combinable.

A PPML interpreter 208 can interpret PPML data. A PS/PDF interpreter 209 can interpret PS data and PDF data. A JPEG/TIFF interpreter 210 can interpret JPEG data and TIFF data. Further, the PS/PDF interpreter 209 and the JPEG/TIFF interpreter 210 can output a display list, that is intermediate data, via a DL builder 212. A cache control unit 211 can cache a drawing object as a bitmap image or a display list. If the PPML data includes an instruction to reuse of a drawing object, the PPML interpreter 208 and the cache control unit 211 cooperatively reuse the drawing object.

FIG. 6 illustrates an example of job definition format (JDF) data that can realize cut and stack imposition processing. The JDF is job ticket standards defined by the International Cooperation for Integration of Processes in Prepress, Press, and Postpress (CIP4), which can include print settings, although details of the JDF are not described hereinafter. The JDF example illustrated in FIG. 6 includes "FileSpecMimeType" that designates VDP data (PPML) as a print data type, "LayoutPreparationParams" in which "Sides" designates one-sided print, "PresentationDirection" that designates the layout order in the cut and stack imposition processing, and "StackDepth" designating that the processing is performed for each processing block of 100 sets.

Figure 7:
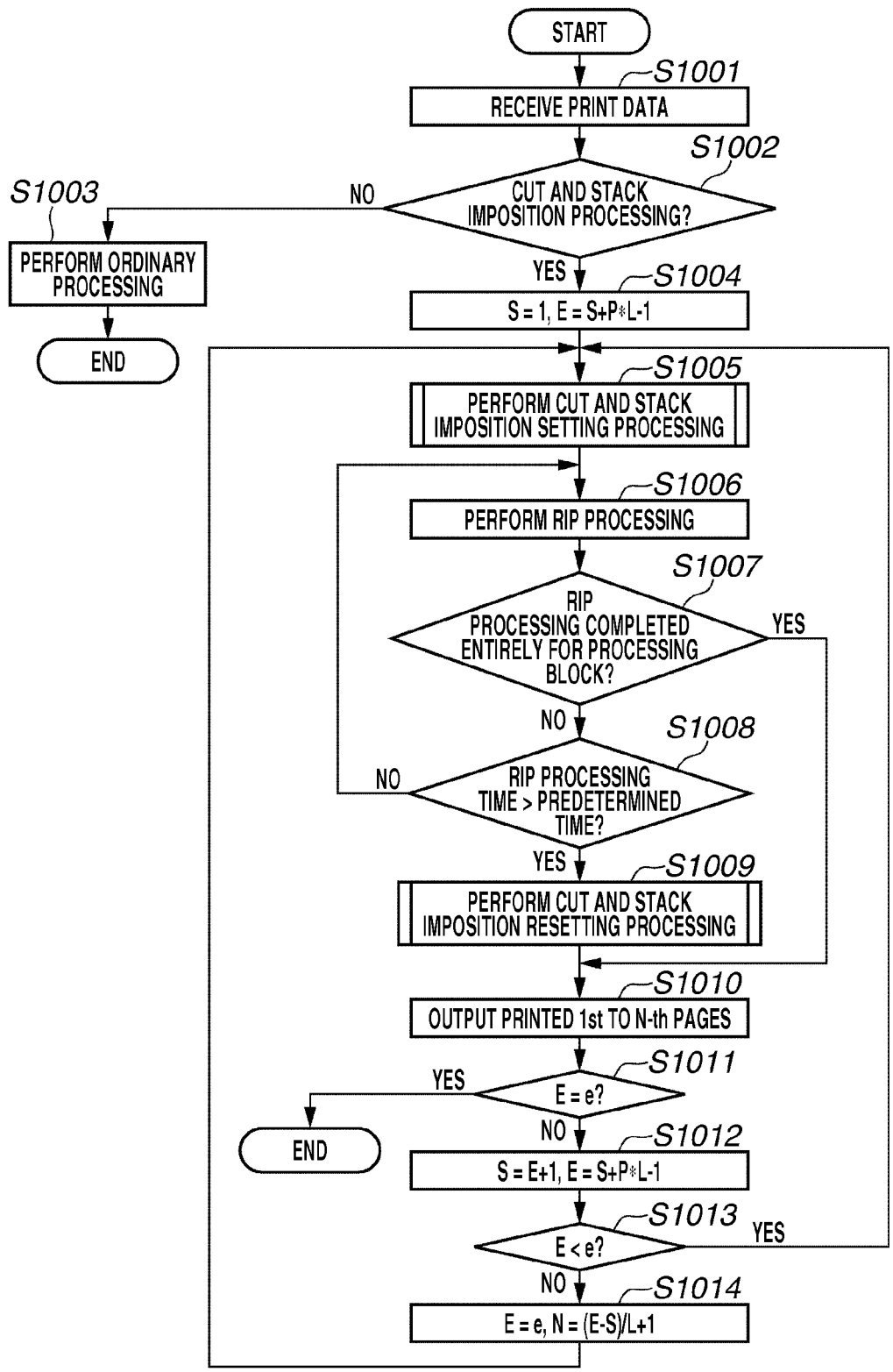
FIG. 7 is a flowchart illustrating an example of RIP processing according to a first exemplary embodiment of the present invention.

Next, overview of the RIP processing according to the present exemplary embodiment is described below with reference to FIG. 7. FIG. 7 is a flowchart illustrating an example of the RIP processing according to the first exemplary embodiment. In the following processing, N represents the total number of recording sheets required to perform the aggregate printing. L represents the aggregation number. P represents the number of pages obtainable through cutting process. S represents the initial page number of the processing block. E represents the last page number of the processing block. "e" represents the last page number of the print data. In the present exemplary embodiment, the processing block is a unit of sheet cutting that defines a group of pages to be simultaneously cut. For example, if the print data includes 400 pages, the first to the 100th pages illustrated in FIG. 2 constitute the processing block. Further, the 101st to the 200th pages, the 201st to the 300th pages, and the 301st to the 400th pages respectively constitute the processing blocks.

First, in step S1001, the data reception unit 201 receives print data transmitted from the information processing apparatus via the network 6 and sends a job input notification to the job control unit 202. The job control unit 202 spools the received print data to the job data management unit 207.

Next, in step S1002, the job control unit 202 determines whether to perform cut and stack imposition processing on the print data. If the job control unit 202 determines that the cut and stack imposition is not performed (NO in step S1002), the processing proceeds to step S1003. If it is determined that the cut and stack imposition is performed (YES in step S1002), the job control unit 202 generates a page information table that stores information relating to the RIP state of each page. Subsequently, the job control unit 202 advances the processing to step S1004.

In step S1003, the job control unit 202 performs ordinary processing because it is unnecessary to perform the cut and stack imposition processing.

In step S1004, the job control unit 202 divides the print data into a plurality of processing blocks each serving as a unit of sheet cutting. The job control unit 202 designates the initial page of the processing block as the initial page (i.e., the first page) of the job. Further, the job control unit 202 calculates a page number by adding the initial page of the processing block, a product of the aggregation number and the number of pages obtainable through cutting process, and "−1" and designates the calculated page number as the last page of the processing block.

Next, in step S1005, the job control unit 202 performs the cut and stack imposition processing on respective pages included in the processing block. The job control unit 202 performs the cut and stack imposition setting on a plurality of pages included in the processing block in such a way that the plurality of pages is disposed within the area of one physical page. The processing to be performed in step S1005 is described in detail below with reference to FIG. 8.

Next, in step S1006, the job control unit 202 starts the RIP processing.

Next, in step S1007, the job control unit 202 determines whether all the pages included in the processing block are in an RIP completed state (i.e., RIP processing completed state). If it is determined that all the pages are in the RIP completed state (YES in step S1007), the job control unit 202 advances the processing to step S1010. If the job control unit 202 determines that the pages included in the processing block are not entirely in the RIP completed state (NO in step S1007), the processing proceeds to step S1008.

Next, in step S1008, the job control unit 202 determines whether the RIP processing time is longer than a predetermined time (e.g., 10 seconds) for a page whose RIP processing is currently in progress. The job control unit 202 calculates the present RIP processing time with reference to RIP start time information included in a page state management table, which is described below. If it is determined that the RIP processing time is equal to or less than the predetermined time (NO in step S1008), the processing of the job control unit 202 returns to step S1006. If the job control unit 202 determines that the RIP processing time is longer than the predetermined time (YES in step S1008), the processing proceeds to step S1009.

In step S1009, the job control unit 202 performs the cut and stack imposition resetting processing. The processing to be performed in step S1009 is described in detail below with reference to FIG. 11. If the cut and stack imposition resetting processing has been completed, the job control unit 202 advances the processing to step S1010.

In step S1010, the job control unit 202 performs the print output processing according to the cut and stack imposition setting set in step S1009. An operator cuts the output sheet printed though the above-described processing with an appropriate cutting machine (not illustrated). The operator can obtain an intended product by stacking a predetermined number of output sheets in a predetermined order. If the processing in step S1010 has been completed, the job control unit 202 advances the processing to step S1011.

Next, in step S1011, the job control unit 202 determines whether the last page number of the processing block being currently processed is the last page number of the print data. If it is determined that the last page number of the current processing block is the last page number of the print data (YES in step S1011), the job control unit 202 terminates the processing of the flowchart illustrated in FIG. 7 because the processing of the entire page data has been completed.

If the job control unit 202 determines that the last page number of the current processing block is not the last page number of the print data (NO in step S1011), the processing proceeds to step S1012. In step S1012, the job control unit 202 updates the processing block. The job control unit 202 designates the next page number that follows the last processing completed page number as the initial page of the processing block. Further, the job control unit 202 calculates a page number by adding the initial page of the processing block, a product of the aggregation number and the number of pages obtainable through cutting process, and "−1" and designates the calculated page number as the last page number of the processing block.

Next, in step S1013, the job control unit 202 determines whether the last page number of the processing block updated in step S1012 is smaller than the last page number of the print data. If the job control unit 202 determines that the last page number of the updated processing block is smaller than the last page number of the print data (YES in step S1013), the processing returns to step S1005 and the job control unit 202 repeats the above-described processing. If it is determined that the last page number of the updated processing block is equal to or greater than the last page number of the print data (NO in step S1013), the job control unit 202 advances the processing to step S1014.

In step S1014, the job control unit 202 updates the last page number of the processing block and the number of pages obtainable through cutting process. The last page number of the processing block becomes equal to the last page number of the print data. The number of pages obtainable through cutting process becomes equal to a value that can be calculated by dividing the difference between the initial page and the last page of the processing block by the aggregation number and then adding 1 to the resultant value. If the update processing with respect to the last page of the processing block and the number of pages has been completed, the processing returns from step S1014 to step S1005 and the job control unit 202 repeats the above-described processing.

The job control unit 202 repeats the above-described processing for all the pages included in the print data. As a result, the job control unit 202 can realize the aggregate printing including relocation of the cut and stack imposition.

Figure 8:
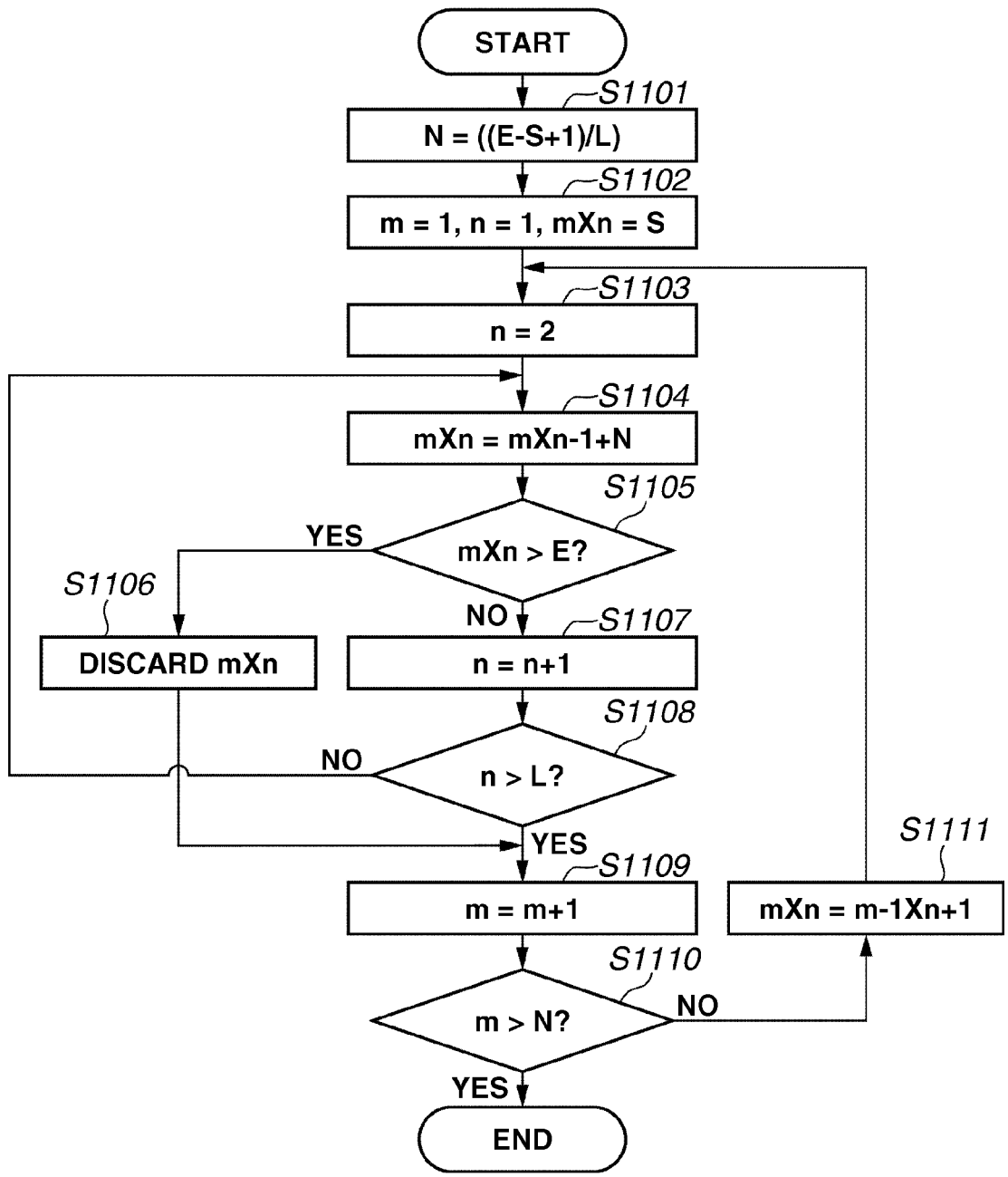
FIG. 8 is a flowchart illustrating an example of cut and stack imposition setting processing.

Subsequently, the cut and stack imposition setting processing to be performed in step S1005 illustrated in FIG. 7 is described in detail below with reference to a flowchart in FIG. 8. FIG. 8 is the flowchart illustrating an example of the cut and stack imposition setting processing.

In the following processing, N represents the total number of recording sheets required to perform the aggregate printing. "m" represents the sheet number of a target recording sheet on which page data is disposed in an aggregate fashion. "n" represents the logical page number allocated to each region corresponding to the aggregation number on the front surface of the target recording sheet on which the page data is disposed in an aggregate fashion. "m×n" represents the page number of the page data disposed at the n-th page on the front surface of the m-th recording sheet. L represents the aggregation number. S represents the initial page number of the processing block. E represents the last page number of the processing block.

First, in step S1101, the job control unit 202 obtains an integer value N. More specifically, the job control unit 202 calculates the integer value N by dividing the number of logical pages included in the processing block by the aggregation number and rounding up the obtained value. The integer value N represents the total number of recording sheets required to perform the aggregate printing.

Next, in step S1102, the job control unit 202 performs initial settings. More specifically, the job control unit 202 sets the sheet number of the recording sheet on which print data is imposed (located) to 1 (i.e., m=1). The job control unit 202 sets the page number of each region obtainable when the front surface of the recording sheet is divided by the aggregation number to 1 (i.e., n=1). Further, the job control unit 202 locates the first page of the page data in the first page region on the front surface of the first recording sheet (i.e., m×n=1).

Next, in step S1103, the job control unit 202 sets the page number "n" to 2 (i.e., n=2). Thus, the logical page number to be allocated to an aggregate printing region is shifted to the second page.

Next, in step S1104, the job control unit 202 sets the page number to be disposed on the second logical page on the m-th recording sheet. The job control unit 202 sets the second logical page by adding the value N obtained in step S1101 to the logical first page.

Next, in step S1105, the job control unit 202 determines whether the page number m×n set to the logical page is greater than the last page number of the processing block. If it is determined that the page number m×n is greater than the last page number of the processing block (YES in step S1105), the job control unit 202 advances the processing to step S1106 because it is presumed that the page number to be disposed is outside the processing block. If the job control unit 202 determines that the page number m×n is equal to or less than the last page number of the processing block (NO in step S1105), the processing proceeds to step S1107.

In step S1106, the job control unit 202 discards the page number m×n. Then, the processing proceeds to step S1109.

In step S1107, the job control unit 202 increments the logical page number by one to shift the target page to the next page, the processing proceeds to step S1108.

Next, in step S1108, the job control unit 202 determines whether the logical page number "n" incremented in step S1107 is greater than the aggregation number L. If it is determined that the logical page number "n" is equal to or less than the aggregation number L (NO in step S1108), the processing returns to step S1104 and the job control unit 202 repeats the above-described processing. If it is determined that the logical page number "n" is greater than the aggregation number L (YES in step S1108), the job control unit 202 advances the processing to step S1109.

In step S1109, the job control unit 202 increments, by one, the sheet number m of the target recording sheet (i.e., physical page) on which print data is disposed in an aggregate fashion.

Next, in step S1110, the job control unit 202 determines whether the sheet number m having been incremented in step S1109 is greater than the total number N of the recording sheets required to perform the aggregate printing. If it is determined that the sheet number m is greater than the total number N (YES in step S1110), the job control unit 202 terminates the processing of the flowchart illustrated in FIG. 8 because the imposition setting processing has been completed for all pages. If the job control unit 202 determines that the sheet number m is equal to or less than the total number N (NO in step S1110), the processing proceeds to step S1111.

In step S1111, the job control unit 202 sets m×n=m−1×n+1. Then, the processing returns to step S1103 and the job control unit 202 starts the processing for the next physical page. In this manner, the job control unit 202 can perform the cut and stack imposition setting for each logical page through the above-described processing.

Next, as an example relating to the above-described processing, in a case where a target processing block of the print data includes 100 pages, how the system according to the present exemplary embodiment performs the cut and stack imposition setting processing is specifically described step by step. FIG. 9 illustrates an example page layout for the aggregate printing, in which the total number of recording sheets required to perform the aggregate printing is 25 and four pages of the print data are arranged on a single recording sheet.

First, in a case where the number of pages included in the page data to be subjected to the aggregate printing is 100 and the designated aggregation number is 4, the total number N of recording sheets required to perform the aggregate printing is 25(=(100−1+1)/4)), i.e., N=25.

Next, so as to obtain an accurate imposition result with respect to the item number through the printout and cutting operation of a total of 25 recording sheets, it is required to perform two cutting operations to cut the recording sheets into quarters (¼). In the present exemplary embodiment, the recording sheets are cut along a vertical line into two groups and further, after the cut sheets are stacked, cut along a horizontal line and stacked to finally obtain piled-up cut sheets (see FIG. 2).

More specifically, four pieces of page data are disposed by the aggregate printing to constitute one page on each recording sheet. Therefore, four regions are set to form a page. The first logical page is positioned in the upper left region of the first recording sheet. The second logical page is positioned in the upper right region. The third logical page is positioned in the lower left region. The fourth logical page is positioned in the lower right region. In this manner, each logical page is allocated to any one of four regions of each physical page on a recording sheet.

Then, as an initial setting, as illustrated in FIG. 10A, through the above-described processing, the first page of the page data is disposed in an upper left region on the front surface of the first recording sheet (as the first logical page), i.e., 1×1=1st item.

Next, 1×2=1×1+N=1+25=26 can be derived through the above-described processing. Thus, the 26th page of the page data is disposed in an upper right region (as the second logical page), i.e., 1×2=26th item.

Further, 1×3=1×2+N=26+25=51 can be derived through the above-described processing. Thus, the 51st page of the page data is disposed in a lower left region (as the third logical page), i.e., 1×3=51st item.

Further, 1×4=1×3+N=51+25=76 can be derived through the above-described processing. Thus, the 76th page of the page data is disposed in a lower right region (as the fourth logical page), i.e., 1×4=76th item.

Next, as illustrated in FIG. 10B, 2×1=1×1+1=1+1=2 can be derived through the above-described processing and therefore the second page of the page data is disposed in an upper left region of the second recording sheet (as the fifth logical page), i.e., 2×1=2nd item.

Further, 2×2=2×1+N=2+25=27 can be derived through the above-described processing. Thus, the 27th page of the page data is disposed in an upper right region (as the sixth logical page), i.e., 2×2=27th item.

Further, 2×3=2×2+N=27+25=52 can be derived through the above-described processing. Thus, the 52nd page of the page data is disposed in a lower left region (as the seventh logical page), i.e., 2×3=52nd item.

Next, 2×4=2×3+N=52+25=77 can be derived through the above-described processing. Thus, the 77th page of the page data is disposed in a lower right region (as the eighth logical page), i.e., 2×4=77th item.

Next, as illustrated in FIG. 10C, 3×1=2×1+1=2+1=3 can be derived through the above-described processing and therefore the third page of the page data is disposed in an upper left region of the third recording sheet (as the ninth logical page), i.e., 3×1=3rd item.

Further, 3×2=3×1+N=3+25=28 can be derived through the above-described processing. Thus, the 28th page of the page data is disposed in an upper right region (as the tenth logical page), i.e., 3×2=28th item.

Further, 3×3=3×2+N=28+25=53 can be derived through the above-described processing. Thus, the 53rd page of the page data is disposed in a lower left region (as the eleventh logical page), i.e., 3×3=53rd item.

Next, 3×4=3×3+N=53+25=78 can be derived through the above-described processing. Thus, the 78th page of the page data is disposed in a lower right region (as the twelfth logical page), i.e., 3×4=78th item.

As described above, the cut and stack imposition can be realized by repetitively performing the processing for imposing logical pages on a total of N physical pages.

Next, the cut and stack imposition resetting processing to be performed for the RIP completed pages in step S1009 illustrated in FIG. 7, which is applied when the predetermined time has elapsed in a state where the RIP processing of a specific page takes a long time, is described below. The cut and stack imposition resetting processing to be performed in step S1009 is described in detail below with reference to a flowchart in FIG. 11. FIG. 11 is the flowchart illustrating an example of the cut and stack imposition resetting processing.

In the following processing, N represents the total number of recording sheets required to perform the aggregate printing. "m" represents the sheet number of a target recording sheet on which page data is disposed in an aggregate fashion. "n" represents the logical page number allocated to each region corresponding to the aggregation number on the front surface of the target recording sheet on which the page data is disposed in an aggregate fashion. Further, "m×n" represents the page number of the page data disposed at the n-th page on the front surface of the m-th recording sheet. L represents the aggregation number. P represents the number of pages obtainable through cutting process. S represents the initial page number of the processing block. E represents the last page number of the processing block.

In step S1201, the job control unit 202 obtains an integer value N. More specifically, the job control unit 202 divides the total number of the first to the last pages included in the processing block by the aggregation number and rounds up the obtained value. The obtained integer value N is the total number of recording sheets required to perform the aggregate printing having been subjected to the relocation. Further, the job control unit 202 updates the last page number E of the processing block with the maximum page number of the RIP completed pages in the processing block.

Processing to be performed subsequently is similar to the cut and stack imposition setting processing performed in step S1005 illustrated in FIG. 7. If the relocation of the first to the N-th physical pages is completed in the cut and stack imposition resetting processing, the job control unit 202 terminates the processing. Through the above-described processing, it becomes feasible to perform the cut and stack imposition exclusively for the RIP completed pages.

Figures 12A, 12B:
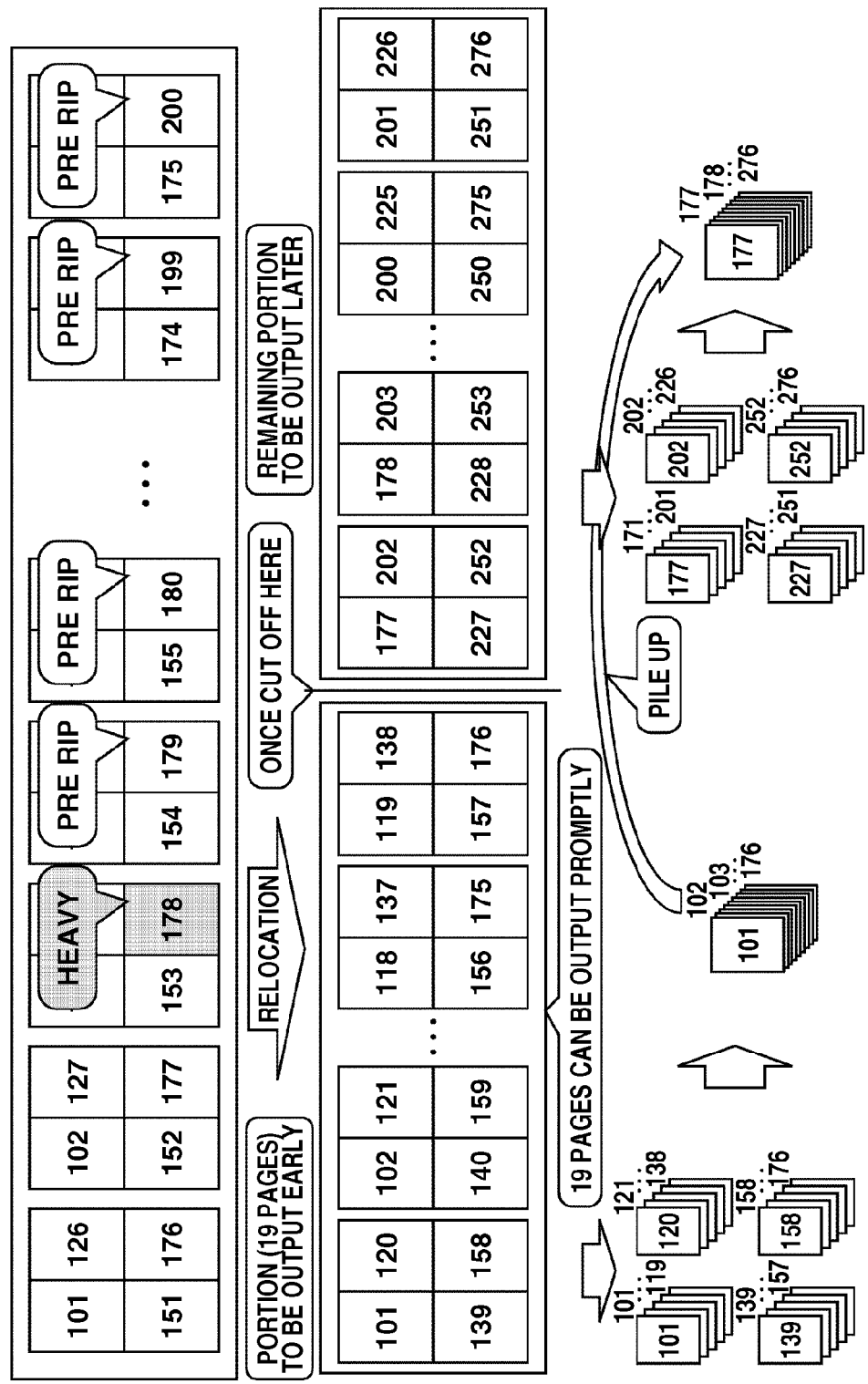
FIGS. 12A and 12B illustrate an example of the processing performed according to the above-described flowcharts.

FIGS. 12A and 12B illustrate an example of the processing performed according to the above-described flowcharts. According to the example illustrated in FIGS. 12A and 12B, a target processing block includes the 101st to the 200th pages. Through the processing performed in step S1005 illustrated in FIG. 7, the cut and stack imposition setting processing illustrated in FIG. 12A can be realized.

In the illustrated example, it is assumed that the RIP processing for the 178th page is so heavy and a predetermined time has elapsed since the RIP processing is started (i.e., the RIP processing does not finish within the predetermined time). In this case, the job control unit 202 performs the processing in step S1009 illustrated in FIG. 7 (i.e., the processing illustrated in FIG. 11). More specifically, the job control unit 202 performs the cut and stack imposition again for the RIP completed pages as illustrated in FIG. 12B. Then, in step S1010 illustrated in FIG. 7, the job control unit 202 outputs a printed product of a preceding portion indicated in FIG. 12B.

In the example illustrated in FIGS. 12A and 12B, the first processing block includes the 101st to the 176th pages. The 176th page is the last page of the first processing block. The 177th page is the page following the last page of the first processing block. Further, the second processing block includes the 177th to the 276th pages. In other words, a plurality of pages included in the 177th to the 276th pages is an example of a plurality of pages included in the second processing block.

As described above, if the RIP processing of a specific page takes a long time, the job control unit 202 performs resetting of the cut and stack imposition on the RIP processing completed pages that precede the specific page in the target processing block and outputs a printed product of the RIP processing completed pages. Then, the job control unit 202 performs resetting (i.e., relocation) on the remaining pages and outputs a printed product of the remaining pages. More specifically, the system according to the present exemplary embodiment can realize relocation by dynamically changing the number of pages obtainable through cutting process even when the processing for a specific page takes a long time in a print job having been subjected to the cut and stack imposition. As a result, it is feasible to eliminate undesirable cycle-down of the system by outputting the pages ready to be printed without delay. The processing time of the entire job thus can be reduced.

In a second exemplary embodiment, in addition to the basic concept of the cut and stack imposition resetting processing, it is described the case that the print data to be processed is VDP data, the CPU 1 is a multi-core CPU, and parallel processing is performed.

The CPU 1 according to the present exemplary embodiment, i.e., the multi-core CPU, includes a plurality of processor cores each serving as a microprocessor, to realize the parallel processing. However, the CPU 1 according to the present exemplary embodiment is not limited to the multi-core CPU. For example, a multi-processor system including a plurality of processors can be employed as a CPU of the present exemplary embodiment. Further, Hyper-Threading technology, or any other technique capable of effectively use the free time of a register or a pipeline of a processor is employable to utilize a single processor as if two or more processors are operating simultaneously. Further, it is feasible to realize distributed processing by employing a configuration in which a host computer connected to an image forming apparatus via a network can execute numerous processing in a distributed fashion.

In the present exemplary embodiment, the multi-core CPU can provide a plurality of PDL interpreters 203 and renderers 204 so that the parallel processing can be realized efficiently. The plurality of cores performing the parallel processing separately include a core that entirely controls a job (see FIG. 7) and a core that serves as a PDL interpreter capable of interpreting a print job.

Figure 13B:
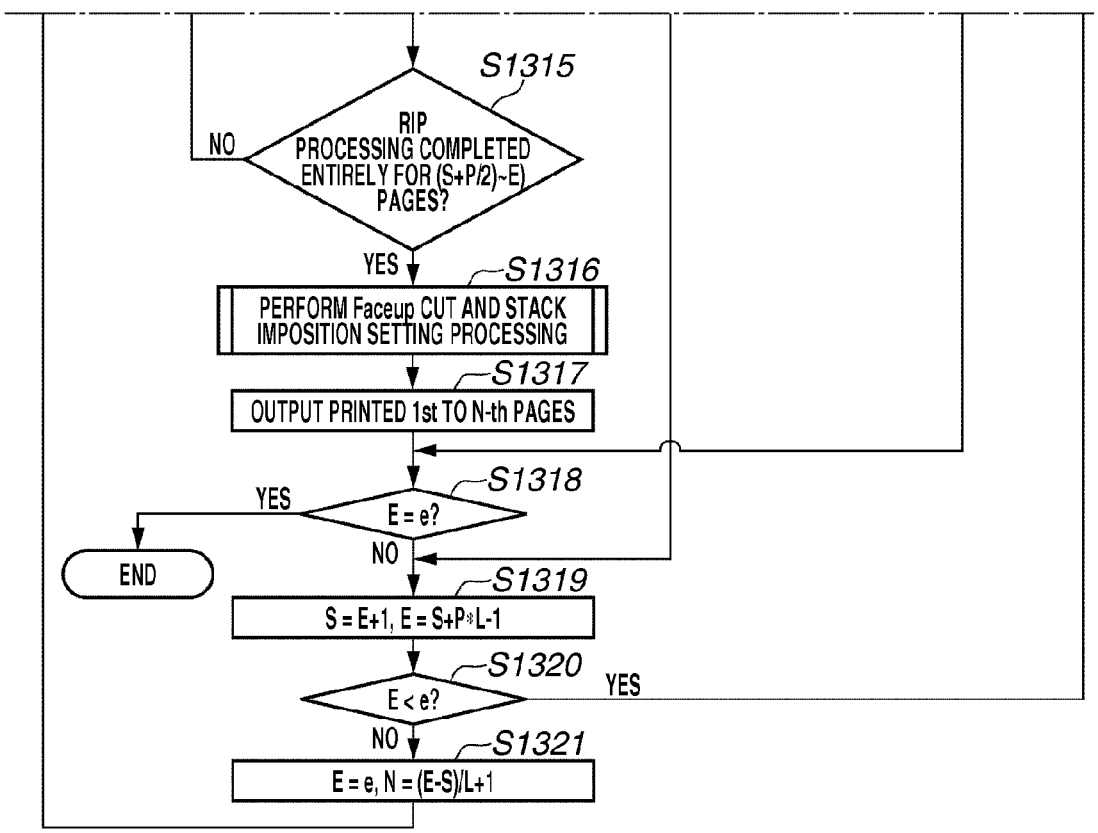
FIG. 13 (including FIGS. 13A and 13B) is a flowchart illustrating an example of RIP processing according to a second exemplary embodiment of the present invention.

FIG. 13 (including FIGS. 13A and 13B) is a flowchart illustrating an example of the RIP processing according to the second exemplary embodiment. In the following processing, N represents the total number of recording sheets required to perform the aggregate printing. L represents the aggregation number. P represents the number of pages obtainable through cutting process. S represents the initial page number of the processing block. E represents the last page number of the processing block. "e" represents the last page number of the print data. In the present exemplary embodiment, the processing block is a unit of sheet cutting that defines a group of pages to be simultaneously cut when the print data pieces are output as print products. For example, if the print data includes 400 pages, the first to the 100th pages illustrated in FIG. 2 constitute the processing block. Further, the 101st to the 200th pages, the 201st to the 300th pages, and the 301st to the 400th pages respectively constitute the processing blocks.

First, in step S1301, the data reception unit 201 receives print data transmitted from the information processing apparatus via the network 6 and sends a job input notification to the job control unit 202. The job control unit 202 spools the received print data to the job data management unit 207.

Next, in step S1302, the job control unit 202 determines whether to perform the cut and stack imposition processing on the print data. If the job control unit 202 determines that the cut and stack imposition is not performed (NO in step S1302), the processing proceeds to step S1303. If it is determined that the cut and stack imposition is performed (YES in step S1302), the job control unit 202 generates a page information table (see FIG. 21) that stores information relating to the RIP state of each page. The page information table is described in detail below. Subsequently, the job control unit 202 advances the processing to step S1304.

In step S1303, the job control unit 202 performs the ordinary processing because it is unnecessary to perform the cut and stack imposition processing.

In step S1304, the job control unit 202 divides the print data into a plurality of processing blocks each serving as a unit of sheet cutting. The job control unit 202 designates the initial page of the processing block as the initial page (i.e., the first page) of the job. Further, the job control unit 202 calculates a page number by adding the initial page of the processing block, a product of the aggregation number and the number of pages obtainable through cutting process, and "−1" and designates the calculated page number as the last page of the processing block.

Next, in step S1305, the job control unit 202 performs the cut and stack imposition processing on respective pages included in the processing block. The processing to be performed in step S1305 is described in detail below with reference to FIG. 8.

Next, in step S1306, the job control unit 202 performs core allocation processing to enable the multi-core CPU to realize the parallel RIP processing for the processing block. The processing to be performed in step S1306 is described in detail below with reference to FIG. 19. If the core allocation processing has been completed, the job control unit 202 advances the processing to step S1307.

Next, in step S1307, the job control unit 202 confirms the state of each core of the multi-core CPU. If it is determined that a free core is present (YES in step S1307), the job control unit 202 advances the processing to step S1308. If the job control unit 202 determines that there is not any free core (NO in step S1307), the processing proceeds to step S1309. In the present exemplary embodiment, the free core is a core that is not currently performing any processing. For example, the core having already completed the RIP processing is a free core.

In step S1308, the job control unit 202 performs precedent core allocation processing that prioritizes performing RIP processing on a page positioned outside the processing block. The processing to be performed in step S1308 is described in detail below with reference to FIG. 20. If the precedent core allocation processing has been completed, the processing of the job control unit 202 returns to step S1307. For example, if the present processing block includes the 101st to the 200th pages, the 201st page is one of the pages positioned outside the processing block. According to this example, the 201st page is allocated to the free core through the precedent core allocation processing. The 101st to 201st pages thus constitute a new processing block. As described above, the system according to the present exemplary embodiment can realize relocation by dynamically changing the unit of sheet cutting (i.e., number of pages). As a result, it is feasible to eliminate undesirable cycle-down of the system by outputting the pages ready to be printed without delay. The processing time of the entire job thus can be reduced.

Next, in step S1309, the job control unit 202 determines whether all the pages included in the processing block are in the RIP completed state (i.e., RIP processing completed). If it is determined that all the pages are in the RIP completed state (YES in step S1309), the job control unit 202 advances the processing to step S1311. If the job control unit 202 determines that the pages included in the processing block are not entirely in the RIP completed state (NO in step S1309), the processing proceeds to step S1310.

Next, in step S1310, the job control unit 202 determines whether the RIP processing time is longer than a predetermined time (e.g., 10 seconds) for a page whose RIP processing is currently in progress. The job control unit 202 calculates the present RIP processing time with reference to RIP start time information included in the page state management table. An example of the page state management table is described in detail below (see FIG. 21). If it is determined that the RIP processing time is equal to or less than the predetermined time (NO in step S1310), the processing of the job control unit 202 returns to step S1307. If it is determined that the RIP processing time is longer than the predetermined time (YES in step S1310), the job control unit 202 advances the processing to step S1312.

In step S1311, the job control unit 202 performs print output processing for the first to the N-th pages according to the cut and stack imposition setting having been set in step S1305. An operator cuts the output sheet printed though the above-described processing with an appropriate cutting machine (not illustrated). The operator can obtain an intended product by stacking a predetermined number of output sheets in a predetermined order. If the processing in step S1311 has been completed, the job control unit 202 advances the processing to step S1318. In each of step S1311, step S1314, and step S1317, the first to the N-th pages are the first to the N-th physical pages in the present processing block.

In step S1312, the job control unit 202 determines whether all the pages constituting the first half portion of the processing block (i.e., the first half of the pages obtainable through cutting process) are in the RIP completed state. If it is determined that all the pages constituting the first half portion are in the RIP completed state (YES in step S1312), the job control unit 202 advances the processing to step S1313. If the job control unit 202 determines that the first half portion is not entirely in the RIP completed state (NO in step S1312), the processing proceeds to step S1315.

In step S1313, the job control unit 202 performs the cut and stack imposition resetting processing. The processing to be performed in step S1313 is described in detail below with reference to FIG. 14. If the cut and stack imposition resetting processing has been completed, the job control unit 202 advances the processing to step S1314.

In step S1314, the job control unit 202 performs print output processing according to the cut and stack imposition setting having been set in step S1313. The operator cuts the output sheet printed though the above-described processing with an appropriate cutting machine (not illustrated). The operator can obtain an intended product by stacking a predetermined number of output sheets in a predetermined order. If the processing in step S1314 has been completed, the job control unit 202 advances the processing to step S1319.

In step S1315, the job control unit 202 determines whether the second half portion of the processing block is in the RIP completed state. If it is determined that the second half portion of the processing block is not entirely in the RIP completed state (NO in step S1315), the processing returns to step S1307 and the job control unit 202 repeats the above-described processing. If the job control unit 202 determines that the second half portion of the processing block is in the RIP completed state (YES in step S1315), the job control unit 202 advances the processing to step S1316.

In the present exemplary embodiment, instead of determining whether the second half portion of the processing block is in the RIP completed state in step S1315, the job control unit 202 can determine whether a portion following a predetermined page of the processing block is in the RIP completed state. In this case, if it is determined that the portion following the predetermined page is not in the RIP completed state, the processing returns to step S1307 and the job control unit 202 repeats the above-described processing. If the job control unit 202 determines that the portion following the predetermined page is in the RIP completed state, the processing proceeds to step S1316.

Next, in step S1316, the job control unit 202 performs the cut and stack imposition setting processing that begins from the last page in Face-Up. Then, the processing proceeds to step S1317. The processing to be performed in step S1316 is described in detail below with reference to FIG. 15. In the present exemplary embodiment, the terminology "Face-Up" indicates that a print product is output with a printed surface facing upward. In the present exemplary embodiment, unless otherwise stated, the job control unit 202 performs the cut and stack imposition setting processing in Face-Down. In the present exemplary embodiment, the terminology "Face-Down" indicates that a print product is output with a printed surface facing downward.

In step S1317, the job control unit 202 performs print output processing according to the cut and stack imposition setting having been set in step S1316. The operator cuts the output sheet printed though the above-described processing with an appropriate cutting machine (not illustrated). The operator can obtain an intended product by stacking a predetermined number of output sheets in a predetermined order. If the processing in step S1317 has been completed, the job control unit 202 advances the processing to step S1318.

The present flowchart includes the cut and stack imposition setting processing to be performed by one of the plurality of cores and allocation processing for allocating a part of the job to another core. To simplify the description, the RIP processing to be performed by the plurality of cores is omitted. For example, in a case where the target processing block includes the 101st to the 200th pages, the 200th to the 101st pages are successively output in the Face-Up (with their printed surfaces facing upward), in step S1317, as illustrated in FIG. 18.

Next, in step S1318, the job control unit 202 determines whether the last page number of the processing block being currently processed is the last page number of the print data. If it is determined that the last page number of the current processing block is the last page number of the print data (YES in step S1318), the job control unit 202 terminates the processing of the flowchart illustrated in FIG. 13 because the processing of the entire page data has been completed. If the job control unit 202 determines that the last page number of the current processing block is not the last page number of the print data (NO in step S1318), the processing proceeds to step S1319.

In step S1319, the job control unit 202 updates the processing block. The job control unit 202 designates the next page number that follows the last processing completed page number as the initial page of the processing block. Further, the job control unit 202 calculates a page number by adding the initial page of the processing block, a product of the aggregation number and the number of pages obtainable through cutting process, and "−1" and designates the calculated page number as the last page number of the processing block.

Next, in step S1320, the job control unit 202 determines whether the last page number of the processing block updated in step S1319 is smaller than the last page number of the print data. If the job control unit 202 determines that the last page number of the updated processing block is smaller than the last page number of the print data (YES instep S1320), the processing returns to step S1305 and the job control unit 202 repeats the above-described processing. If it is determined that the last page number of the updated processing block is equal to or greater than the last page number of the print data (NO in step S1320), the job control unit 202 advances the processing to step S1321.

In step S1321, the job control unit 202 updates the last page number of the processing block and the number of pages obtainable through cutting process. The last page number of the processing block becomes equal to the last page number of the print data. The number of pages obtainable through cutting process becomes equal to a value that can be calculated by dividing the difference between the initial page and the last page of the processing block by the aggregation number and then adding 1 to the resultant value.

If the update processing with respect to the last page of the processing block and the number of pages has been completed in step S1321, the processing returns to step S1305 and the job control unit 202 repeats the above-described processing. The job control unit 202 repeats the above-described processing for all the pages included in the print data. As a result, the job control unit 202 can realize the aggregate printing including relocation of the cut and stack imposition.

Figure 14:
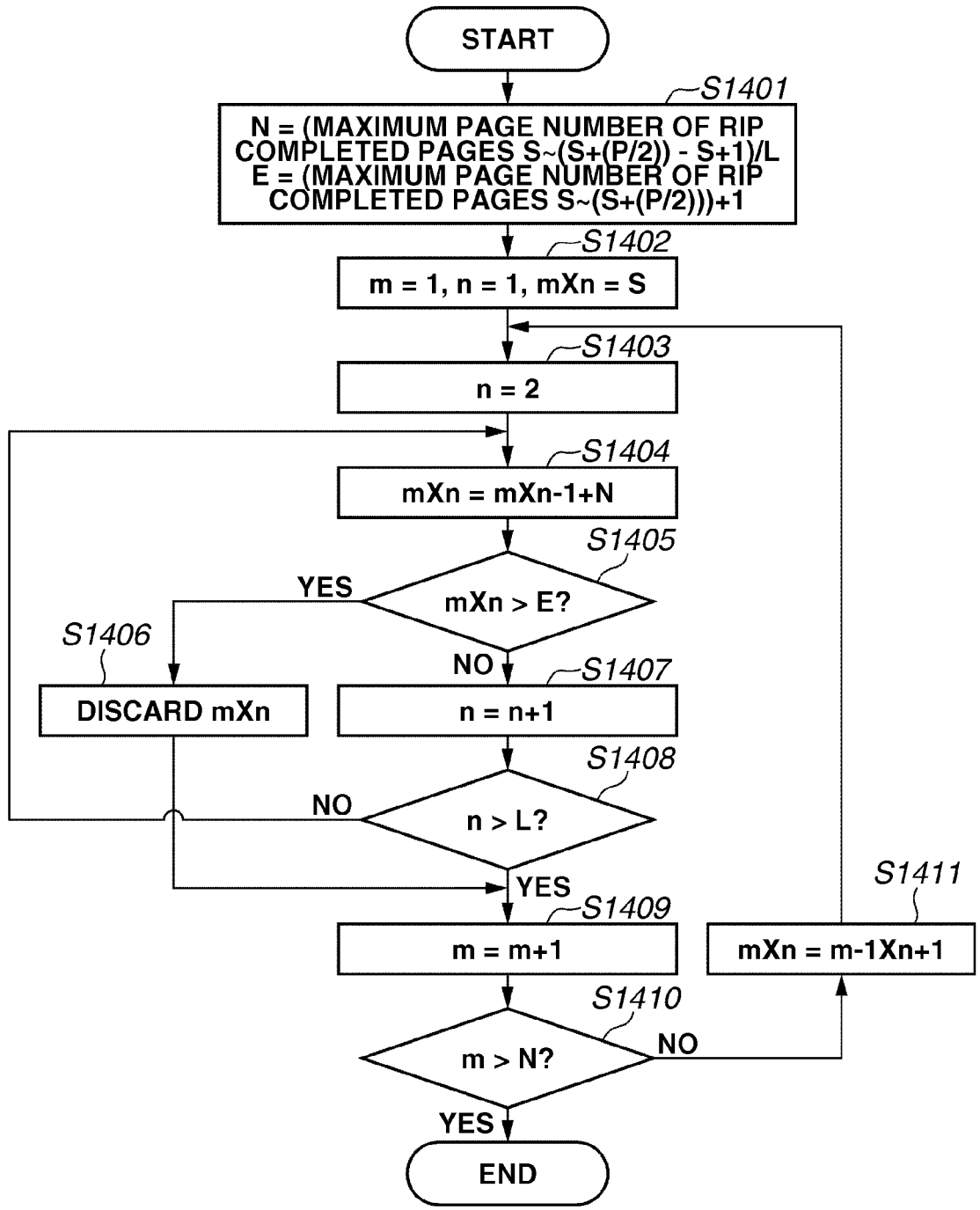
FIG. 14 is a flowchart illustrating an example of the cut and stack imposition resetting processing.

Next, the cut and stack imposition resetting processing to be performed for the RIP completed pages in the first half portion in step S1313 illustrated in FIG. 13, which is applied when the predetermined time has elapsed in a state where the RIP processing of a specific page takes a long time, is described below. The cut and stack imposition resetting processing is described in detail below with reference to a flowchart in FIG. 14. FIG. 14 is the flowchart illustrating an example of the cut and stack imposition resetting processing.

In the following processing, N represents the total number of recording sheets required to perform the aggregate printing. "m" represents the sheet number of a target recording sheet on which page data is disposed in an aggregate fashion. "n" represents the logical page number allocated to each region corresponding to the aggregation number on the front surface of the target recording sheet on which the page data is disposed in an aggregate fashion. "m×n" represents the page number of the page data disposed at the n-th page on the front surface of the m-th recording sheet. L represents the aggregation number. P represents the number of pages obtainable through cutting process. S represents the initial page number of the processing block. E represents the last page number of the processing block.

In step S1401, the job control unit 202 obtains an integer value N. More specifically, the job control unit 202 divides the total number of pages included in a region ranging from the first page to a half of the number of pages obtainable through cutting process in the processing block by the aggregation number and rounds up the obtained value. The obtained integer value N is the total number of recording sheets required to perform the aggregate printing having been subjected to the relocation. Further, the job control unit 202 updates the last page number E of the processing block with the last page number in the first half of the processing block.

Processing to be performed subsequently is similar to the cut and stack imposition setting processing performed in step S1305 illustrated in FIG. 13. If the relocation of the first to the N-th physical pages has been completed in the cut and stack imposition resetting processing, the job control unit 202 terminates the processing.

Figure 15:
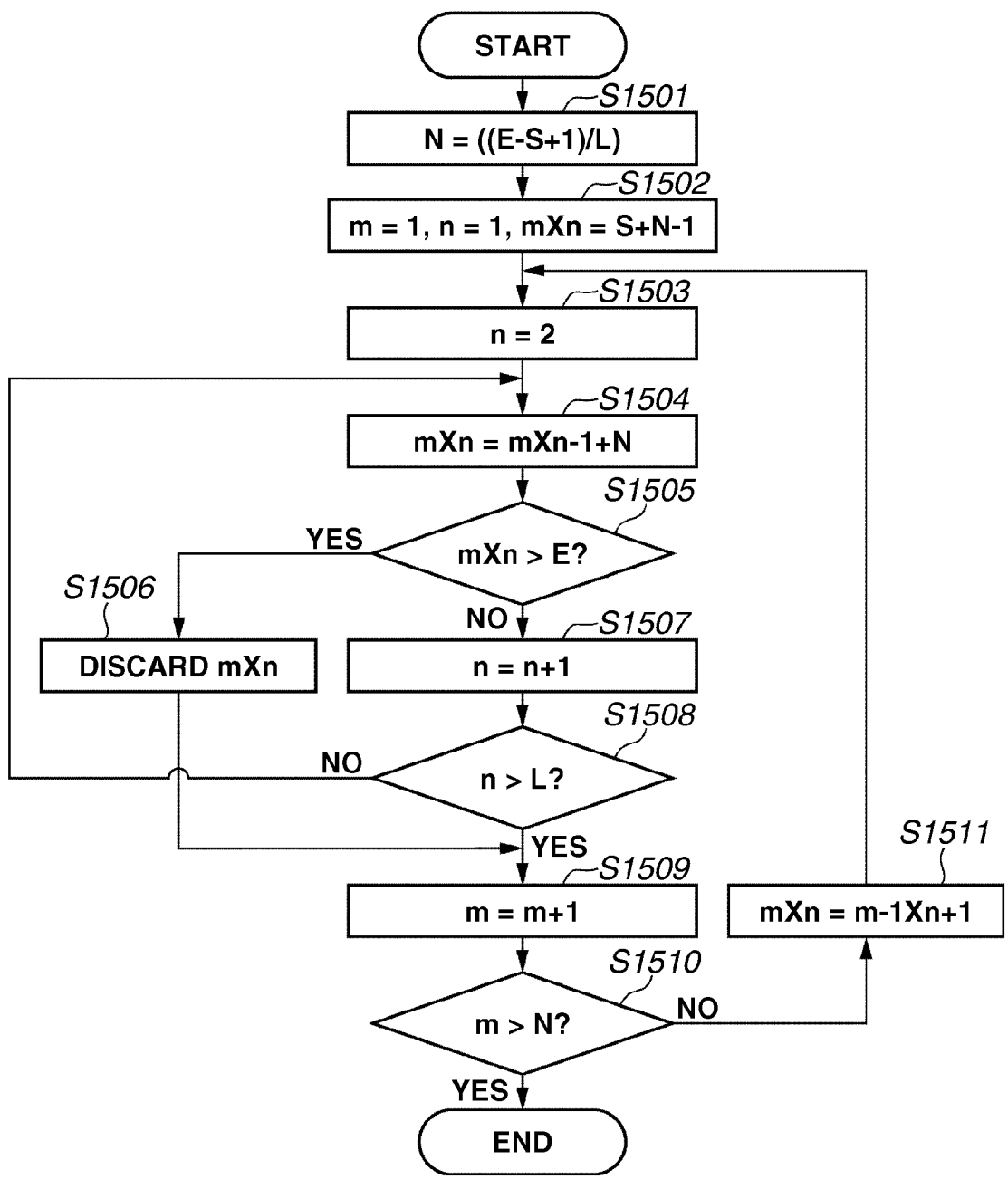
FIG. 15 is a flowchart illustrating an example of the cut and stack imposition setting processing.

Next, the resetting processing to be performed for RIP completed pages in the second half portion in step S1316 illustrated in FIG. 13, which is applied when the predetermined time has elapsed in a state where the RIP processing of a specific page takes a long time, is described below. In this case, the cut and stack imposition setting processing begins from the physical page including the last page of the processing block, and a print product is output in the Face-Up. The cut and stack imposition setting processing is described in detail below with reference to a flowchart in FIG. 15. FIG. 15 is the flowchart illustrating an example of the cut and stack imposition setting processing.

In the following processing, N represents the total number of recording sheets required to perform the aggregate printing. "m" represents the sheet number of a target recording sheet on which page data is disposed in an aggregate fashion. "n" represents the logical page number allocated to each region corresponding to the aggregation number on the front surface of the target recording sheet on which the page data is disposed in an aggregate fashion. "m×n" represents the page number of the page data disposed at the n-th page on the front surface of the m-th recording sheet. L represents the aggregation number. P represents the number of pages obtainable through cutting process. S represents the initial page number of the processing block. E represents the last page number of the processing block.

The processing to be performed in the flowchart in FIG. 15 is substantially similar to the cut and stack imposition setting processing performed in step S1305 illustrated in FIG. 13, except for processing to be performed in step S1502 and step S1511.

In step S1502, the job control unit 202 performs initial settings. More specifically, the job control unit 202 sets the sheet number of the recording sheet on which print data is imposed (located) to 1 (i.e., m=1). The job control unit 202 sets the page number of each region obtainable when the back surface of the recording sheet is divided by the aggregation number to 1 (i.e., n=1). Further, the job control unit 202 adds the page number of the first page of the print data, the total number N of recording sheets required to perform the aggregate printing, and "−1" to set a value for the first page region on the back surface of the first recording sheet (i.e., m×n=S+N−1).

Further, in step S1511, the job control unit 202 sets m×n=m−1×n−1. Then, the processing returns to step S1503. Processing to be performed subsequently is similar to the cut and stack imposition processing performed in step S1305 illustrated in FIG. 13 and therefore the description thereof is not repeated.

As an example relating to the above-described processing, the system according to the present exemplary embodiment performs the cut and stack imposition setting processing that begins from the last page of the processing block so that a print product can be output in the Face-Up (with its recorded surface facing upward). According to this example, the print data includes 100 pages in the processing block is 100, and the initial page number of the processing block is 101, and the last page number is 200. FIG. 16 illustrates an example page layout for the aggregate printing applicable to Face-Up relocation, in which the total number of recording sheets required to perform the aggregate printing is 25, and four pages of the page data collectively constitute a single recording sheet.

First, in a case where the number of pages included in the page data to be subjected to the aggregate printing is 100 and the designated aggregation number is 4, the total number N of recording sheets required to perform the aggregate printing is 25(=(100−1+1)/4)), i.e., N=25.

Next, so as to obtain an accurate imposition result with respect to the item number through the printout and cutting operation of a total of 25 recording sheets, it is required to perform two cutting operations to cut the recording sheets into quarters (¼). In the present exemplary embodiment, the recording sheets are cut along a vertical line into two groups and further, after the cut sheets are stacked, cut along a horizontal line and stacked to finally obtain piled-up cut sheets.

More specifically, four pieces of page data are disposed by the aggregate printing to constitute one page on each recording sheet. Therefore, four regions are set to form a page. The first logical page is positioned in the upper left region of the first recording sheet. The second logical page is positioned in the upper right region. The third logical page is positioned in the lower left region. The fourth logical page is positioned in the lower right region. In this manner, each logical page is allocated to any one of four regions of each physical page on a recording sheet.

Then, as an initial setting, as illustrated in FIG. 17A, through the above-described processing, the first page of the page data is disposed in an upper left region on the back surface of the first recording sheet (as the first logical page), i.e., 1×1=S+N−1=101+25−1=125th item.

Next, 1×2=1×1+N=125+25=150 can be derived through the above-described processing. Thus, the 150th page of the page data is disposed in an upper right region (as the second logical page), i.e., 1×2=150th item.

Further, 1×3=1×2+N=150+25=175 can be derived through the above-described processing. Thus, the 175th page of the page data is disposed in a lower left region (as the third logical page), i.e., 1×3=175th item.

Further, 1×4=1×3+N=175+25=200 can be derived through the above-described processing. Thus, the 200th page of the page data is disposed in a lower right region (as the fourth logical page), i.e., 1×4=200th item.

Next, as illustrated in FIG. 17B, 2×1=1×1−1=125−1=124 can be derived through the above-described processing and therefore the second page of the page data is disposed in an upper left region on the back surface of the second recording sheet (as the fifth logical page), i.e., 2×1=124th item.

Further, 2×2=2×1+N=124+25=149 can be derived through the above-described processing. Thus, the 149th page of the page data is disposed in an upper right region (as the sixth logical page), i.e., 2×2=149th item.

Further, 2×3=2×2+N=149+25=174 can be derived through the above-described processing. Thus, the 174th page of the page data is disposed in a lower left region (as the seventh logical page), i.e., 2×3=174th item.

Next, 2×4=2×3+N=174+25=199 can be derived through the above-described processing. Thus, the 199th page of the page data is disposed in a lower right region (as the eighth logical page), i.e., 2×4=199th item.

Next, as illustrated in FIG. 17C, 3×1=2×1+1=124−1=123 can be derived through the above-described processing and therefore the third page of the page data is disposed in an upper left region on the back surface of the third recording sheet (as the ninth logical page), i.e., 3×1=123rd item.

Further, 3×2=3×1+N=123+25=148 can be derived through the above-described processing. Thus, the 148th page of the page data is disposed in an upper right region (as the tenth logical page), i.e., 3×2=148th item.

Further, 3×3=3×2+N=148+25=173 can be derived through the above-described processing. Thus, the 173rd page of the page data is disposed in a lower left region (as the eleventh logical page), i.e., 3×3=173rd item.

Next, 3×4=3×3+N=173+25=198 can be derived through the above-described processing. Thus, the 198th page of the page data is disposed in a lower right region (as the twelfth logical page), i.e., 3×4=198th item.

As described above, the Face-Up relocation of the cut and stack imposition beginning from the last page of the processing block can be realized by repetitively performing the processing for imposing the logical pages on a total of N physical pages.

FIGS. 18A to 18C illustrate an example of the processing performed in step S1315 to step S1317 illustrated in FIG. 13. According to the example illustrated in FIGS. 18A to 18C, a target processing block includes the 101st to the 200th pages. Through the processing performed in step S1315 illustrated in FIG. 13, if it is determined that the RIP processing is in progress for the pages in the first half portion of the processing block and the pages in the second half portion are in the RIP completed state as illustrated in FIG. 18A, then through the processing performed in step S1316 illustrated in FIG. 13, the Face-Up cut and stack imposition setting processing is performed as illustrated in FIGS. 18B and 18C. Then, through the processing in step S1317 illustrated in FIG. 13, a preceding portion in FIG. 18B of the RIP completed pages is output early in the Face-Up. Then, a portion in FIG. 18C of the remaining pages is output later in the Face-Up.

Figure 19:
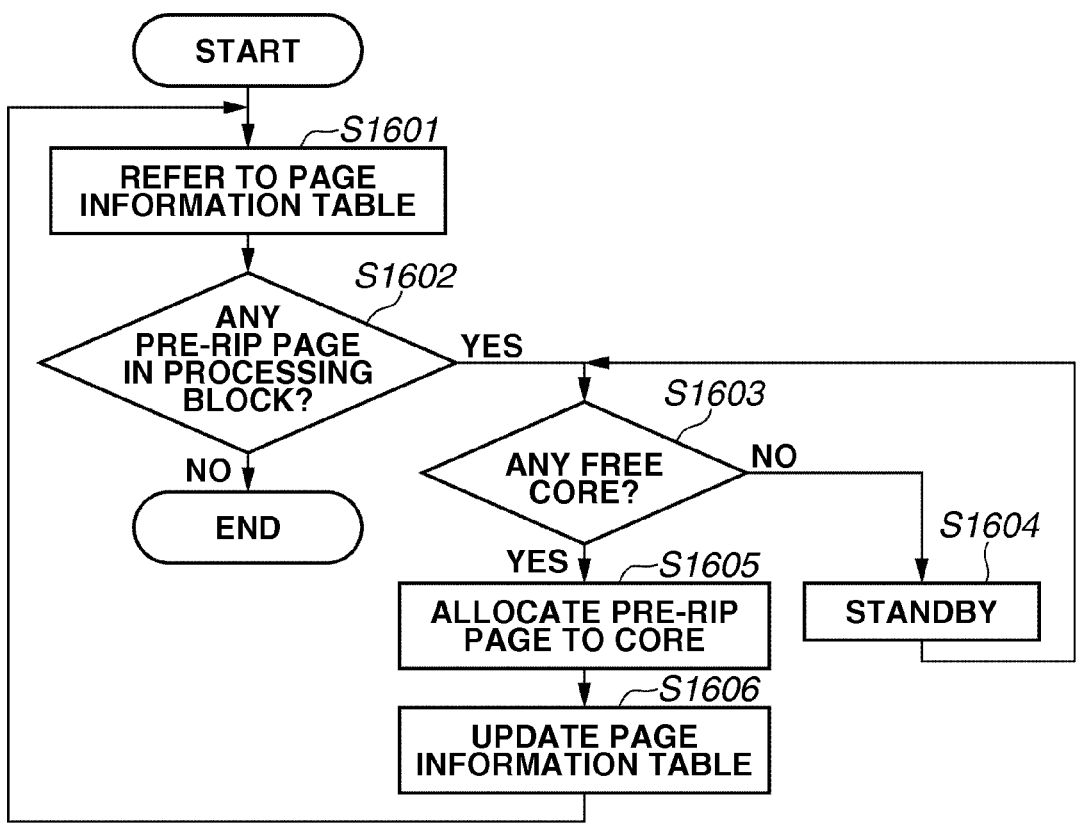
FIG. 19 is a flowchart illustrating an example of core allocation processing.

Next, the core allocation processing that can be realized by the multi-core CPU (i.e., the processing to be performed in step S1306 illustrated in FIG. 13) is described in detail below with reference to a flowchart in FIG. 19. FIG. 19 is the flowchart illustrating an example of the core allocation processing.

First, in step S1601, the job control unit 202 refers to the RIP processing state of a page included in the processing block with reference to the page state management table.

Next, in step S1602, the job control unit 202 determines whether the processing block includes a page that is not yet subjected to the RIP processing (i.e., a pre-RIP page). If it is determined that there is not any pre-RIP page in the processing block (NO in step S1602), the job control unit 202 terminates the processing of the flowchart illustrated in FIG. 19. If the job control unit 202 determines that there is at least one pre-RIP page in the processing block (YES in step S1602), the processing proceeds to step S1603.

Next, in step S1603, the job control unit 202 confirms the state of each core of the multi-core CPU. If it is determined that there is not any free core (NO in step S1603), then in step S1604, the job control unit 202 waits until the processing of each core completes. If the job control unit 202 determines that a free core is present (YES in step S1603), the processing proceeds to step S1605.

Next, in step S1605, the job control unit 202 allocates a pre-RIP page to the free core.

Next, in step S1606, the job control unit 202 updates the page state management table for the allocated page. Further, the job control unit 202 changes the RIP processing state from "pre-RIP" to "RIP in progress" for the page allocated to the free core in step S1605. Then, the processing returns to step S1601.

Each core performs the RIP processing for each allocated page. If the RIP processing has been completed, the core changes the RIP processing state of the allocated page from "RIP in progress" to "RIP completed" on the page state management table. Subsequently, each core waits until the job control unit 202 allocates another page to be processed or terminates the job. When each core repeats the above-described processing, the RIP processing of the pages included in the processing block can be performed in a parallel fashion.

Figure 20:
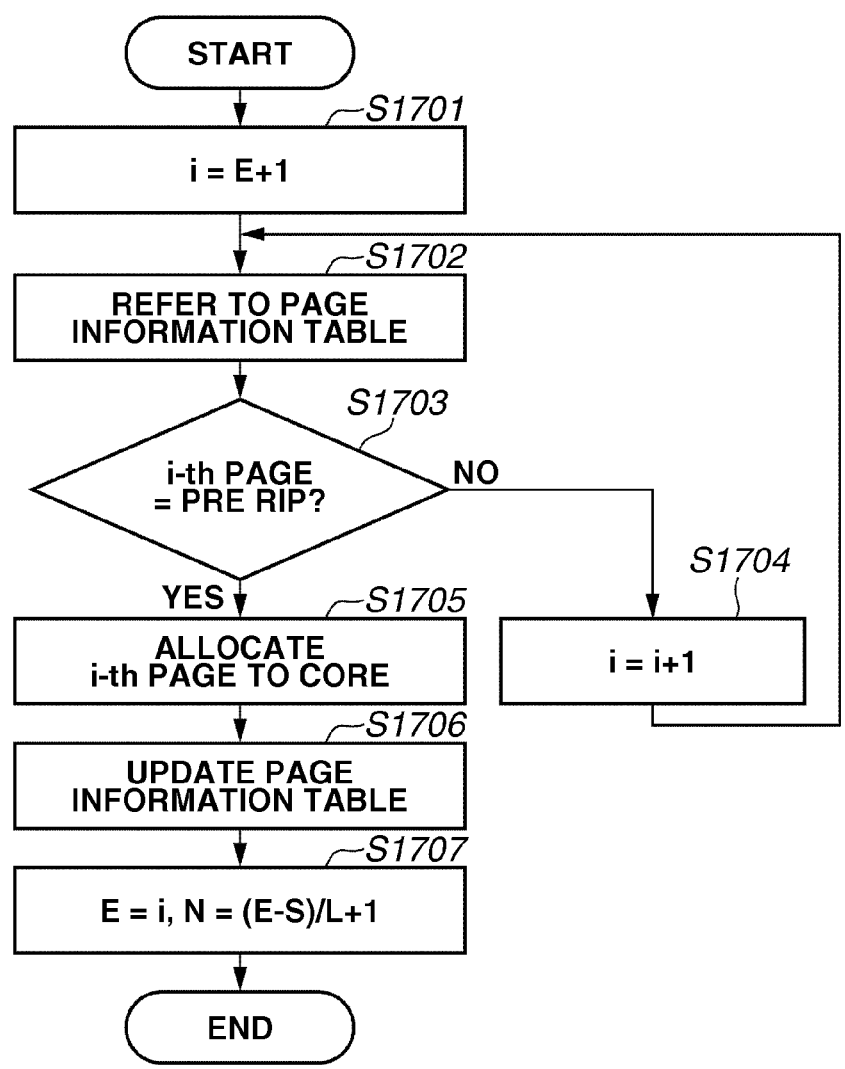
FIG. 20 is a flowchart illustrating an example of precedent core allocation processing.

Next, the precedent core allocation processing to realize preceding RIP processing that can be performed by the multi-core CPU (i.e. the processing to be performed in step S1308 illustrated in FIG. 13) is described in detail below with reference to a flowchart in FIG. 20. FIG. 20 is the flowchart illustrating an example of the precedent core allocation processing.

In the following processing, "i" represents the page number of a preceding RIP target. N represents the total number of recording sheets required to perform the aggregate printing. S represents the initial page number of the processing block. E represents the last page number of the processing block. L represents the aggregation number. If the processing block includes the 101st to the 200th pages as described above, the initial page number S is 101 and the last page number E is 200.

In step S1701, the job control unit 202 adds 1 to the last page number and sets the page number following the last page number to the page number "i" as an initial setting. According to the above-described example, through the processing performed in step S1701, the 201st page is set as the following page "i" positioned outside the processing block.

Next, in step S1702, the job control unit 202 refers to the page state management table.

Next, in step S1703, the job control unit 202 determines whether the RIP processing has been started on the i-th page. If it is determined that the RIP processing has been started on the i-th page (NO in step S1703), the job control unit 202 advances the processing to step S1704. If the job control unit 202 determines that the RIP processing has not been started yet on the i-th page (YES in step S1703), the processing proceeds to step S1705.

In step S1704, the job control unit 202 increments the page number "i" by one to set the next page. Subsequently, the processing returns to step S1702. The job control unit 202 repeats the above-described processing.

In step S1705, the job control unit 202 allocates the i-th page to the core. Then, the processing proceeds to step S1706.

In step S1706, the job control unit 202 changes the RIP processing state of the i-th page from "pre-RIP" to "RIP in progress" on the page state management table. Then, the processing proceeds to step S1707.

In step S1707, the job control unit 202 updates the last page number of the processing block and the total number of recording sheets required to perform the aggregate printing. The job control unit 202 sets the last page number of the processing block to "i." Further, the job control unit 202 sets the total number of recording sheets required to perform the aggregate printing to a value of "(the last page number of the processing block—the initial page number of the processing block)/aggregation number +1". Then, the job control unit 202 terminates the processing of the flowchart illustrated in FIG. 20.

Each core performs the RIP processing for each allocated page. If the RIP processing has been completed, the core changes the RIP processing state of the allocated page from "RIP in progress" to "RIP completed" on the page state management table. Subsequently, each core waits until the job control unit 202 allocates another page to be processed or terminates the job.

Through the above-described processing, the RIP processing of a page positioned outside the processing block can be performed at early timing if the RIP processing of a specific page in the processing block takes along time and the RIP processing of other pages has been already completed.

Next, the page state management table is described below with reference to FIG. 21. FIG. 21 illustrates an example of the page state management table according to the second exemplary embodiment. The page state management table can be stored in the RAM 2 or in the HDD 4.

The page state management table includes information relating to a page number, a RIP processing state, and RIP start time. The RIP processing state is information representing the processing state of a page. The information in the "RIP processing state" field is any one of "pre-RIP", "RIP in progress", and "RIP completed." The "RIP processing state" information can be updated at the timing when the job control unit 202 allocates a page to a core or when the core completes the RIP processing. Further, the information in the "RIP start time" field indicates the time when the RIP processing of each page has been started and can be used to calculate the RIP processing time in step S1310 illustrated in FIG. 13. The job control unit 202 generates the page information table in the determination of a cut and stack imposition job in step S1302 illustrated in FIG. 13.

As described above, if the RIP processing of a specific page takes a long time, the job control unit 202 can perform the cut and stack imposition resetting on the RIP processing completed pages in a range preceding the specific page among a plurality of pages included in the target processing block, so that a print product of the RIP processing completed pages can be output without delay. Then, the job control unit 202 performs resetting (i.e., relocation) on the remaining pages and outputs a printed product of the remaining pages. More specifically, the system according to the present exemplary embodiment can realize relocation by dynamically changing the number of pages obtainable through cutting process even when the processing for a specific page takes a long time in a print job having been subjected to the cut and stack imposition. As a result, it is feasible to eliminate undesirable cycle-down of the system by outputting the pages ready to be printed without delay. The processing time of the entire job thus can be reduced.

In the above-described exemplary embodiments, the system performs the RIP processing and, if the RIP processing time of a specific page exceeds a predetermined time, dynamically perform relocation of the imposition. However, in a third exemplary embodiment, the system predicts the RIP time in advance with reference to characteristics of preparse processing unique to the VDP job and divides a cutting block adequately to perform the cut and stack imposition. Performing the cut and stack imposition setting processing beforehand is useful because an operator can confirm the layout in advance. Further, the output timing of a print product of the first page is relatively quicker than that in the first exemplary embodiment, since each RIP completed page can be output promptly.

Figure 22:
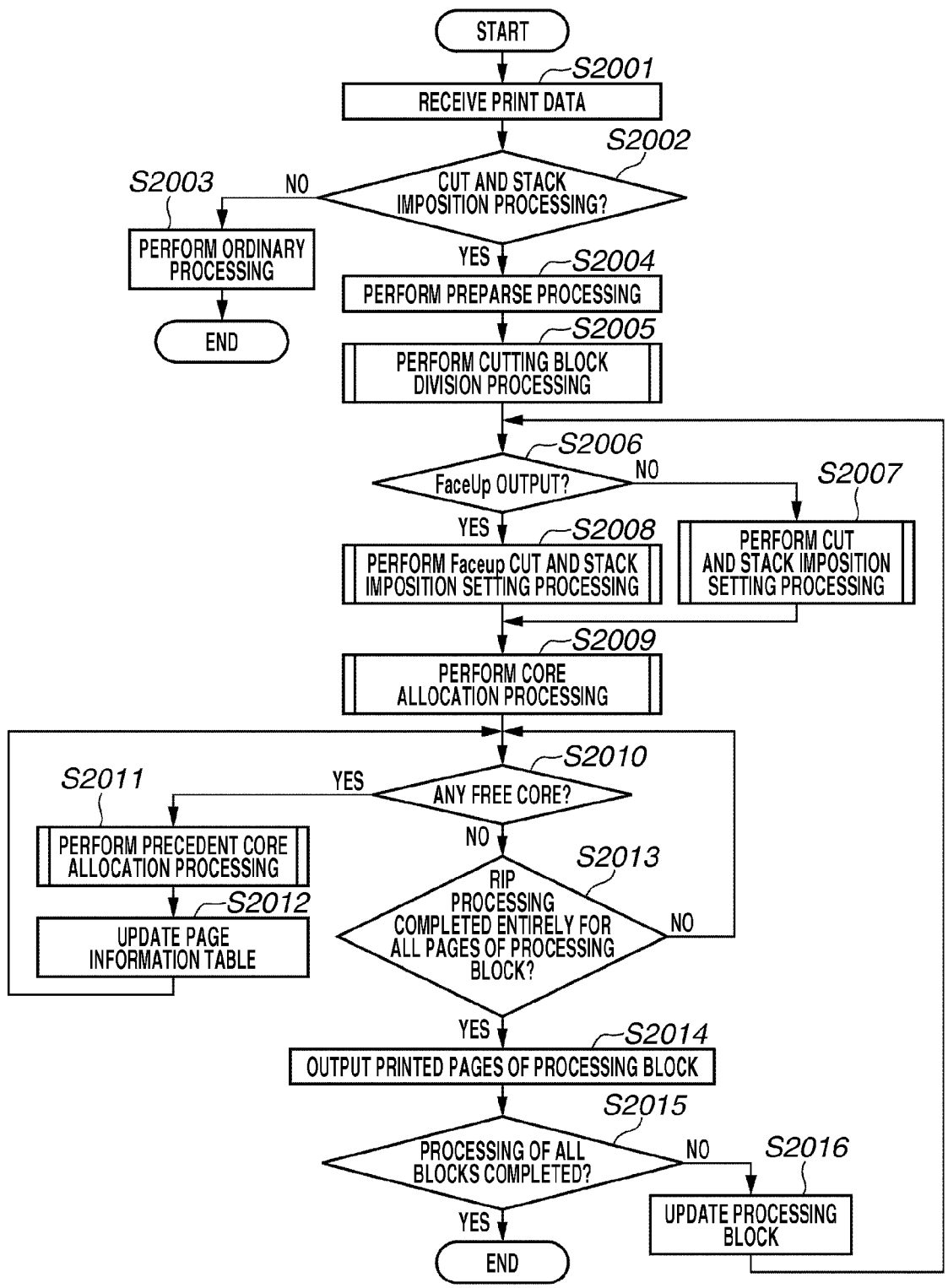
FIG. 22 is a flowchart illustrating an example of RIP processing according to a third exemplary embodiment of the present invention.

First, the RIP processing according to the present exemplary embodiment is described below with reference to FIG. 22. FIG. 22 is a flowchart illustrating an example of the RIP processing according to the third exemplary embodiment.

First, in step S2001, the data reception unit 201 receives print data transmitted from the information processing apparatus via the network 6 and sends a job input notification to the job control unit 202. The job control unit 202 spools the received print data to the job data management unit 207.

Next, in step S2002, the job control unit 202 determines whether to perform cut and stack imposition processing on the print data. If the job control unit 202 determines that the cut and stack imposition is not performed (NO in step S2002), the processing proceeds to step S2003. If it is determined that the cut and stack imposition is performed (YES in step S2002), the job control unit 202 generates a page information table illustrated in FIG. 24. The page information table is described in detail below. When the generation of the page information table has been completed, the job control unit 202 advances the processing to step S2004.

In step S2003, the job control unit 202 performs the ordinary processing because the cut and stack imposition is not performed and terminates the processing of the flowchart illustrated in FIG. 22.

In step S2004, the job control unit 202 outputs a preparse instruction to the PDL interpreter 203. When the PDL interpreter 203 receives the preparse instruction from the job control unit 202, the PDL interpreter 203 performs preparse processing on a print job. In the preparse processing, the PDL interpreter 203 counts the number of reusable objects and the number of variable objects in each page included in the print data. The count result can be stored in the page information table.

Next, instep S2005, the job control unit 202 performs cutting block division processing for determining a cutting block of the print data with reference to the information of the page information table. The cutting block division processing is described in detail below. If the cutting block division processing has been completed, the job control unit 202 advances the processing to step S2006.

Next, in step S2006, the job control unit 202 determines whether the target processing block is a Face-Up processing block with reference to the information of the page information table. If it is determined that the target processing block is a block to be output in the Face-Up (YES in step S2006), the job control unit 202 advances the processing to step S2008. If the job control unit 202 determines that target processing block is not the block to be output in the Face-Up (NO in step S2006), the processing proceeds to step S2007.

In step S2007, the job control unit 202 performs the cut and stack imposition setting processing. The cut and stack imposition setting processing to be performed in step S2007 is similar to the processing described in the first exemplary embodiment and therefore the description thereof is not repeated. If the cut and stack imposition setting processing has been completed, the job control unit 202 advances the processing to step S2009.

In step S2008, the job control unit 202 performs the cut and stack imposition setting processing that begins from the last page in the Face-Up. The processing proceeds to step S2009. The cut and stack imposition setting processing to be performed in step S2008 is similar to the processing described in the first exemplary embodiment and therefore the description thereof is not repeated.

Next, instep S2009, the job control unit 202 performs core allocation processing. The core allocation processing to be performed in step S2009 is similar to the processing (see FIG. 19) described in the first exemplary embodiment. Accordingly, the description thereof is not repeated. If the core allocation processing has been completed, the job control unit 202 advances the processing to step S2010.

Next, instep S2010, the job control unit 202 confirms the state of a core provided in the multi-core CPU. If the job control unit 202 determines that a free core is present (YES in step S2010), the processing proceeds to step S2011. If the job control unit 202 determines that there is not any free core (NO in step S2010), the processing proceeds to step S2013.

In step S2011, the job control unit 202 performs precedent core allocation processing that can be performed by the free core to perform preceding RIP processing for a page positioned outside the processing block. The precedent core allocation processing to be performed in step S2011 is similar to the processing (see FIG. 20) described in the first exemplary embodiment and therefore the description thereof is not repeated. If the precedent core allocation processing has been completed, the job control unit 202 advances the processing to step S2012.

In step S2012, the job control unit 202 updates the page information table. In the present exemplary embodiment, the job control unit 202 changes the RIP processing state of the page allocated in the precedent core allocation processing from "pre-RIP" to "RIP in progress" on the page information table. If the update processing has been completed, the processing of the job control unit 202 returns to step S2010.

In step S2013, the job control unit 202 determines whether all the pages included in the processing block are in the RIP completed state. If it is determined that all the pages are not entirely in the RIP completed state (NO in step S2013), the processing returns to step S2010 and the job control unit 202 repeats the above-described processing. If the job control unit 202 determines that all the pages are in the RIP completed state (YES in step S2013), the processing proceeds to step S2014.

In step S2014, the job control unit 202 outputs a print product of the pages included in the processing block. Then, the processing proceeds to step S2015.

Next, in step S2015, the job control unit 202 determines whether the processing of all blocks has been completed. If it is determined that the processing of all blocks has been completed (YES in step S2015), the job control unit 202 terminates the processing of the flowchart illustrated in FIG. 22. If the job control unit 202 determines that the processing of all blocks has not yet been completed (NO in step S2015), the processing proceeds to step S2016.

In step S2016, the job control unit 202 designates the next processing block as a new target processing block. Subsequently, the processing proceeds to step S2006. The job control unit 202 repeats the above-described processing (including the imposition setting processing and the print output processing) for all blocks. The cut and stack imposition resetting processing using a preparse result of the print data can be realized through the above-described processing.

Figure 23:
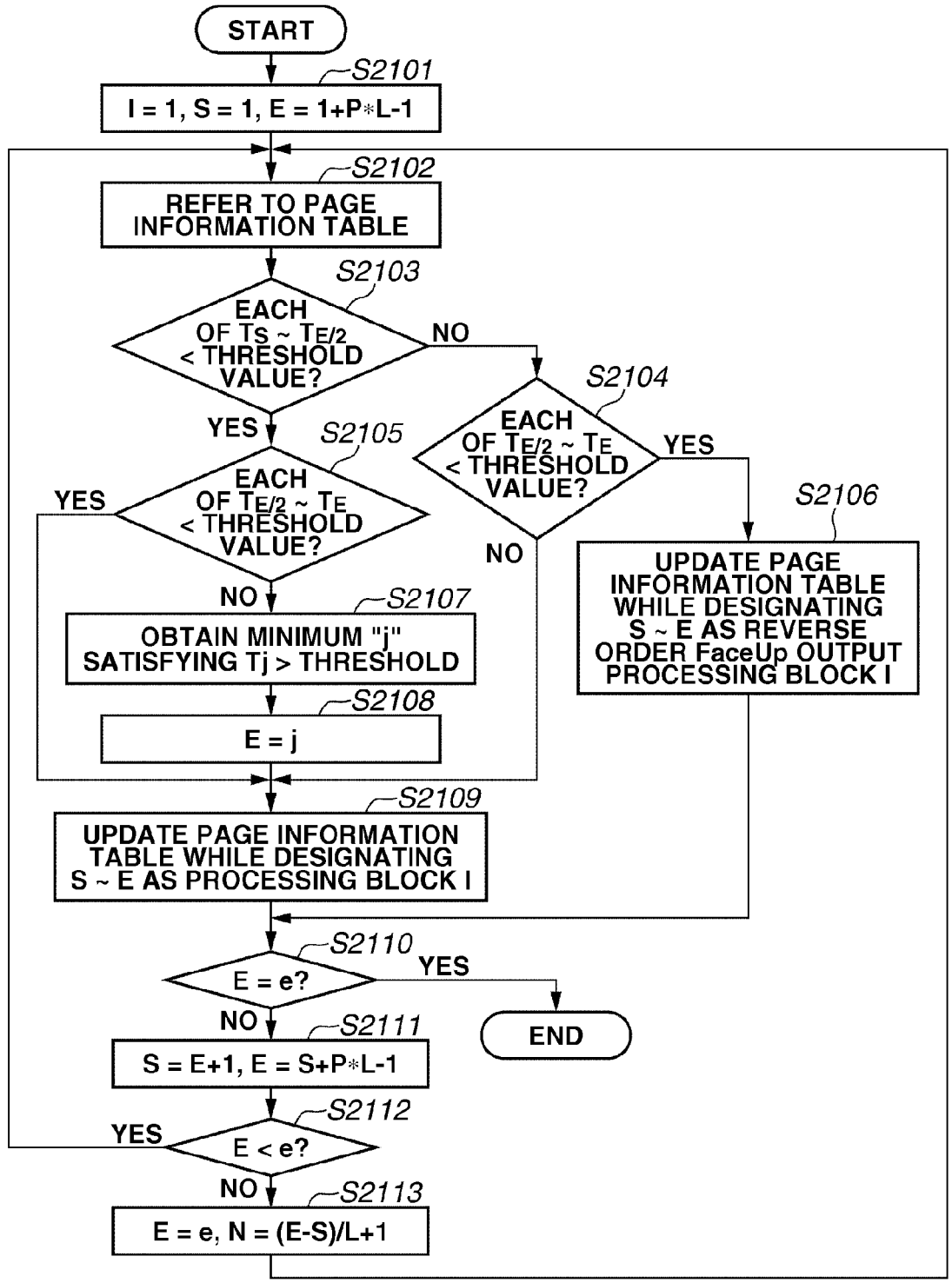
FIG. 23 is a flowchart illustrating an example of cutting block division processing.

Next, the cutting block division processing to be performed in step S2005 illustrated in FIG. 22 is described in detail below with reference to FIG. 23. FIG. 23 is a flowchart illustrating an example of the cutting block division processing.

In the following processing, N represents the total number of recording sheets required to perform the aggregate printing. L represents the aggregation number. P represents the number of pages obtainable through cutting process. S represents the initial page number of the processing block. E represents the last page number of the processing block. "e" represents the last page number of the print data. "j" represents the page number of a processing target. Tj represents the RIP prediction time of the target page "j." "I" represents the block number of the target processing block. R represents a weighting factor of reusable objects. V represents a weighting factor of variable objects.

First, in step S2101, the job control unit 202 performs initial settings. More specifically, the job control unit 202 sets the target processing block I to 1 and sets the initial page number S of the processing block to 1. Further, the job control unit 202 sets the last page number E of the processing block to a value that can be obtained by multiplying the number of pages obtainable through cutting process by the aggregation number.

Next, in step S2102, the job control unit 202 refers to the page information table. The job control unit 202 calculates a RIP prediction time T with reference to the information of the page information table. The job control unit 202 sets the RIP prediction time T to a sum of a product "(the number of reusable objects)×(weighting factor R)" and a product "(the number of variable objects)×(weighting factor V)." The job control unit 202 calculates the RIP prediction time T for the processing block ranging from the initial page number S to the last page number E.

Next, in step S2103, the job control unit 202 determines whether the RIP prediction time T of each page included in the first half of the processing block is smaller than a threshold value. If it is determined that the RIP prediction time T of at least one page in the first half portion is equal to or greater than the threshold value (NO in step S2103), the job control unit 202 advances the processing to step S2104 because it can be predicted that the RIP processing for the first half portion of the processing block takes along time. If the job control unit 202 determines that the RIP prediction time T of each page in the first half portion is smaller than the threshold value (YES in step S2103), the processing proceeds to step S2105.

In step S2104, the job control unit 202 determines whether the RIP prediction time T of each page included in the second half of the processing block is smaller than a threshold value. If it is determined that the RIP prediction time T of each page in the second half portion is smaller than the threshold value (YES in step S2014), it can be predicted that the RIP processing for the first half portion takes a long time and the RIP processing for the second half portion does not take a long time. Accordingly, in this case, the job control unit 202 advances the processing to step S2106.

If the job control unit 202 determines that the RIP prediction time T of at least one page in the second half portion is equal to or greater than the threshold value (NO in step S2014), it can be predicted that each of the first half portion and the second half portion includes a page that takes a long time in RIP processing. Accordingly, in this case, the job control unit 202 advances the processing to step S2109 to perform ordinary processing.

In step S2105, the job control unit 202 determines whether the RIP prediction time T of each page included in the second half of the processing block is smaller than a threshold value. If it is determined that the RIP prediction time of each page is smaller than the threshold value (YES in step S2105), it can be predicted that the RIP processing of the processing block from the page number S to the page number E does not take a long time. Accordingly, in this case, the job control unit 202 advances the processing to step S2109.

If it is determined that the RIP prediction time of at least one page of the second half portion is equal to or greater than the threshold value (NO in step S2105), it can be predicted that the RIP processing of the first half portion does not take a long time and the RIP processing for the second half portion takes a long time. Accordingly, in this case, the job control unit 202 advances the processing to step S2107.

In step S2106, the job control unit 202 updates the page information table. The processing block from the page number S to the page number E is designated as a Face-Up cut and stack imposition block to be output from the last page. If the update of the page information table has been completed, the job control unit 202 advances the processing to step S2110.

In step S2107, the job control unit 202 obtains a minimum page number "j" of the page included in the processing block, which is predicted to take a longtime in RIP processing.

Then, the processing proceeds to step S2108, the job control unit 202 sets the last page number E of the processing block to a value expressed by (j−(the remainder of j/L)). Subsequently, the processing proceeds to step S2109.

In step S2109, the job control unit 202 updates the page information table to designate the processing block from the page number S to the page number E as a target of the cut and stack imposition processing.

Next, in step S2110, the job control unit 202 determines whether the last page number E of the processing block is identical to the last page number "e" of the print data. If it is determined that the last page number E of the processing block is identical to the last page number "e" of the print data (YES in step S2110), the job control unit 202 terminates the processing of the flowchart illustrated in FIG. 23 because the setting of all the pages included in the processing block has been completed. If the job control unit 202 determines that the last page number E of the processing block is different from the last page number "e" of the print data (NO in step S2110), the processing proceeds to step S2111.

In step S2111, the job control unit 202 updates the S value and the E value. The job control unit 202 sets the initial page number S of the processing block to a sum of the last page number E of the processing block and "+1." The job control unit 202 sets the last page number E of the processing block to a sum of the initial page number S of the processing block, a product of the number of pages obtainable through cutting process and the aggregation number, and "−1."

Next, the processing proceeds to step S2112, and the job control unit 202 determines whether the last page number E of the processing block is smaller than the last page number "e" of the print data. If it is determined that E is smaller than "e" (YES in step S2112), the processing of the job control unit 202 returns to step S2102. The job control unit 202 repeats the above-described processing. If the job control unit 202 determines that E is equal to or greater than "e" (NO in step S2112), the last page number E of the processing block is in a data range that is a processing block not existing in the print data. Therefore, the job control unit 202 advances the processing to step S2113.

In step S2113, the job control unit 202 updates the values of the last page number E and the total number N of recording sheets required to perform the aggregate printing. More specifically, the job control unit 202 sets the last page number E of the processing block to be identical to the last page number "e" of the print data. The job control unit 202 sets the total number N of recording sheets required to perform the aggregate printing to a sum of "(the last page number of the processing block)−(the initial page number of the processing block)/the aggregation number" and "+1." If the update of the E and N values has been completed, the processing returns to step S2102, and the job control unit 202 repeats the print data update processing. In this manner, the cutting block division processing based on the RIP prediction time with use of a preparse result can be realized by repeating the above-described processing for the first to the last page of the print data.

Next, the page information table is described below with reference to FIG. 24. FIG. 24 illustrates an example of the page state management table according to the third exemplary embodiment. The page state management table can be stored in the RAM 2 or in the HDD 4.

The page information table illustrated in FIG. 24 includes information relating to a page number, the number of reusable objects, the number of variable objects, a RIP processing state, processing block ID, and an output form. The number of reusable objects and the number of variable objects respectively indicate the total number of reusable objects and the total number of variable objects included in each page. The RIP processing state is the information representing the processing state of a page. The information in the "RIP processing state" field is any one of "pre-RIP", "RIP in progress", and "RIP completed." The "RIP processing state" information can be updated at the timing when the job control unit 202 allocates a page to a core or when the core completes the RIP processing. Further, the processing block ID is identification (ID) information that identifies the processing block to which each page belongs. The information in the "output form" field indicates how the cut and stack imposition is performed, i.e., the output by Face-Down that begins from the initial page of the processing block or the output by Face-Up that begins from the last page of the processing block.

The job control unit 202 generates the page information table in the determination of a cut and stack imposition job (i.e., the processing in step S2002 illustrated in FIG. 22).

Figure 25:
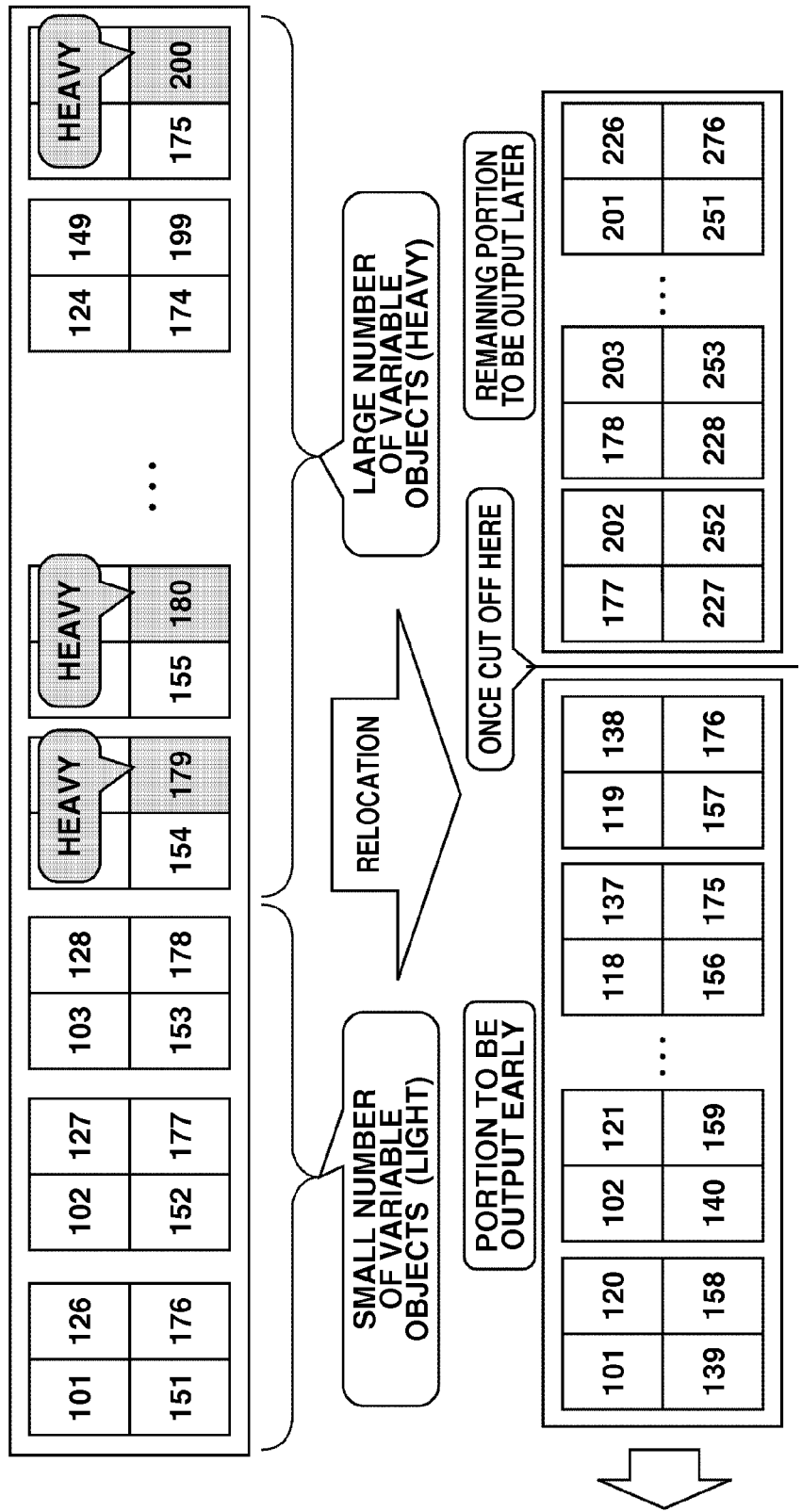
FIG. 25 illustrates an example of the processing performed in step S2005 illustrated in FIG. 22.

FIG. 25 illustrates an example of the processing performed in step S2005 illustrated in FIG. 22. As described above, the RIP time of each page can be predicted through the preparse processing. Therefore, the layout can be changed beforehand and the number of pages in cutting process can be changed adequately.

As described above, the system according to the present exemplary embodiment can realize relocation by changing the number of pages obtainable through cutting process beforehand even when the processing for a specific page takes a long time in a print job having been subjected to the cut and stack imposition. As a result, it is feasible to perform scheduling considering the RIP prediction time in such a way as to eliminate undesirable cycle-down of the system and reduce the processing time of the entire job.

As described above, the system according to each of the above-described exemplary embodiments can reduce the time required to output a printed product of the entire print data.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-120660 filed May 30, 2011, which is hereby incorporated by reference herein in its entirety.

What is claimed is:

1. An image processing apparatus, comprising:
   a division unit configured to divide print data into processing blocks, each including a predetermined number of pages as a unit of sheet cutting;
   a cut and stack imposition setting unit configured to perform cut and stack imposition setting on a plurality of pages included in the processing block so as to dispose the plurality of pages included in the processing block within a region of one physical page;
   a raster image processor (RIP) processing unit configured to perform RIP processing on the plurality of pages included in the processing block which are subjected to the cut and stack imposition by the cut and stack imposition setting unit;
   a setting unit configured, if RIP processing time of a specific page of the plurality of pages in the processing block exceeds a predetermined time, the RIP processing of the specific page is not yet completed, and the RIP processing of pages preceding the specific page is already completed, to set a processing block which includes only the RIP processing completed pages that precede the specific page and the number of pages included in the set processing block is less than the predetermined number of pages;
   a cut and stack imposition resetting unit configured to perform resetting of the cut and stack imposition on the plurality of pages included in the processing block in such a way as to dispose the plurality of RIP processing completed pages included in the processing block set within a region of one physical page by the setting unit; and
   an output unit configured to print and output the plurality of pages included in the processing block based on the cut and stack imposition reset by the resetting unit.

2. The image processing apparatus according to claim 1, wherein the setting unit is configured to set a first processing block that includes only the RIP processing completed pages preceding the specific page and the number of pages is less than the predetermined number of pages, if the RIP processing time of the specific page of the plurality of pages included in the processing block exceeds the predetermined time and the RIP processing of the specific page is not yet completed, and the setting unit is further configured to set a second processing block that begins from a page following the last page of the first processing block and the number of pages included in the second processing block is equal to the predetermined number of pages,
   the cut and stack imposition setting unit is configured to perform cut and stack imposition setting on a plurality of pages included in the second processing block, after the output unit has printed and output the plurality of pages included in the first processing block, in such a way as to dispose the plurality of pages included in the second processing block within a region of one physical page,
   the RIP processing unit is configured to perform RIP processing on the plurality of pages included in the second processing block which are subjected to the cut and stack imposition by the cut and stack imposition setting unit, and
   the output unit is configured to print and output the plurality of pages included in the second processing block which are subjected to the RIP processing by the RIP processing unit.

3. The image processing apparatus according to claim 1, wherein the RIP processing unit is configured to perform RIP processing on the plurality of pages included in the processing block in parallel processing, and
   the image processing apparatus further comprising a change unit configured, if the RIP processing allocated to a specific one of the parallel processing has been completed, to change the processing block dynamically in such a way as to increase the number of pages in the processing block and utilize the specific processing for the RIP processing.

4. The image processing apparatus according to claim 1, further comprising a Face-Up cut and stack imposition setting unit configured, if the RIP processing time of a specific page of the plurality of pages in the processing block exceeds a predetermined time, the RIP processing of the specific page is not yet completed, and the RIP processing of pages following the specific page is already completed, to performs Face-Up cut and stack imposition setting on the plurality of pages included in the processing block in such away as to dispose the plurality of RIP processing completed pages sequentially from the last page within a region of one physical page,
   wherein the output unit is configured to print and output the plurality of pages included in the processing block with their printed surfaces facing upward based on the Face-Up cut and stack imposition set by the Face-Up cut and stack imposition setting unit.

5. The image processing apparatus according to claim 1, further comprising a prediction unit configured to predict RIP processing time of a page based on the number of reusable objects and the number of variable objects included in the plurality of pages in the processing block.

6. A method for causing an image processing apparatus to perform image processing, the method comprising:
   dividing print data into processing blocks, each including a predetermined number of pages as a unit of sheet cutting;
   performing cut and stack imposition setting on a plurality of pages included in the processing block in such a way as to dispose the plurality of pages included in the processing block within a region of one physical page;
   performing RIP processing on the plurality of pages included in the processing block which are subjected to the cut and stack imposition;
   setting, if RIP processing time of a specific page of the plurality of pages in the processing block exceeds a predetermined time, the RIP processing of the specific page is not yet completed, and the RIP processing of pages preceding the specific page is already completed, a processing block which includes only the RIP processing completed pages that precede the specific page and the number of pages included in the set processing block is less than the predetermined number of pages;

performing resetting of the cut and stack imposition on the plurality of pages included in the processing block in such a way as to dispose the plurality of RIP processing completed pages included in the processing block set within a region of one physical page; and printing and outputting the plurality of pages included in the processing block based on the cut and stack imposition having been reset.

7. A computer readable non-transitory storage medium storing a program that causes a computer to execute image processing, the program comprising:

dividing print data into processing blocks, each including a predetermined number of pages as a unit of sheet cutting;

performing cut and stack imposition setting on a plurality of pages included in the processing block in such a way as to dispose the plurality of pages included in the processing block within a region of one physical page;

performing RIP processing on the plurality of pages included in the processing block which are subjected to the cut and stack imposition;

setting, if RIP processing time of a specific page of the plurality of pages in the processing block exceeds a predetermined time, the RIP processing of the specific page is not yet completed, and the RIP processing of pages preceding the specific page is already completed, a processing block which includes only the RIP processing completed pages that precede the specific page and the number of pages included in the set processing block is less than the predetermined number of pages;

performing resetting of the cut and stack imposition on the plurality of pages included in the processing block in such a way as to dispose the plurality of RIP processing completed pages included in the processing block set within a region of one physical page; and printing and outputting the plurality of pages included in the processing block based on the cut and stack imposition having been reset.

\* \* \* \* \*